United States Patent
Du et al.

(10) Patent No.: US 10,750,451 B2
(45) Date of Patent: Aug. 18, 2020

(54) METHODS AND DEVICES FOR SENDING AND RECEIVING WAKE-UP FRAME

(71) Applicant: Huawei Technologies Co., Ltd., Shenzhen (CN)

(72) Inventors: Zhenguo Du, Shenzhen (CN); Yong Cheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/476,198

(22) PCT Filed: Jun. 19, 2017

(86) PCT No.: PCT/CN2017/089002
§ 371 (c)(1),
(2) Date: Jul. 5, 2019

(87) PCT Pub. No.: WO2018/126612
PCT Pub. Date: Jul. 12, 2018

(65) Prior Publication Data
US 2020/0037251 A1    Jan. 30, 2020

(30) Foreign Application Priority Data
Jan. 6, 2017    (CN) .......................... 2017 1 0011116

(51) Int. Cl.
*H04W 52/02*    (2009.01)
*H04W 28/06*    (2009.01)

(52) U.S. Cl.
CPC ..... *H04W 52/0235* (2013.01); *H04W 28/065* (2013.01)

(58) Field of Classification Search
CPC ........... H04W 52/0235; H04W 28/065; H04W 52/02; H04W 84/12; Y02D 70/00
(Continued)

(56) References Cited

U.S. PATENT DOCUMENTS

| | | | | |
|---|---|---|---|---|
| 2015/0071153 A1* | 3/2015 | Hong | .................... | H04L 5/0023 370/311 |
| 2015/0245290 A1 | 8/2015 | Liu | | |
| 2019/0281551 A1* | 9/2019 | Kim | .................... | H04W 52/02 |

FOREIGN PATENT DOCUMENTS

| CN | 102938928 A | 2/2013 |
|---|---|---|
| CN | 104202806 A | 12/2014 |

(Continued)

OTHER PUBLICATIONS

Machine Translation and Abstract of Chinese Publication No. CN104202806, Dec. 10, 2014, 15 pages.
(Continued)

*Primary Examiner* — Eugene Yun
(74) *Attorney, Agent, or Firm* — Conley Rose, P.C.

(57) ABSTRACT

A method for sending a wake-up frame includes generating, by a sending device, a plurality of short wake-up frames, where each of the plurality of short wake-up frames includes an index and an address segment. The index is used to indicate a number of the address segment, the plurality of short wake-up frames include at least N short wake-up frames whose indexes are different from each other, N is a positive integer, and N≥2. The method further includes sending, by the wake-up device, the plurality of short wake-up frames so that a receiving device can determine, based on N address segments carried in any N short wake-up frames whose indexes are different from each other in the plurality of short wake-up frames, whether the receiving device is a target wake-up device of the sending device.

20 Claims, 11 Drawing Sheets

(58) Field of Classification Search
USPC .......................................................... 455/574
See application file for complete search history.

(56) References Cited

FOREIGN PATENT DOCUMENTS

| | | |
|---|---|---|
| CN | 104301973 A | 1/2015 |
| CN | 105227215 A | 1/2016 |

OTHER PUBLICATIONS

Machine Translation and Abstract of Chinese Publication No. CN104301973, Jan. 21, 2015, 23 pages.
Machine Translation and Abstract of Chinese Publication No. CN105227215, Jan. 6, 2016, 14 pages.
Intel Corporation, "LP-WUR (Low-Power Wake-Up Receiver) Follow-Up" IEEE 802.11-16/0341r0, Mar. 14th, 2016, 9 pages.
Foreign Communication From a Counterpart Application, PCT Application No. PCT/CN2017/089002, English Translation of International Search Report dated Aug. 2, 2017, 2 pages.
Foreign Communication From a Counterpart Application, PCT Application No. PCT/CN2017/089002, English Translation of International Search Report dated Aug. 2, 2017, 3 pages.

* cited by examiner

METHODS AND DEVICES FOR SENDING AND RECEIVING WAKE-UP FRAME

CROSS-REFERENCE TO RELATED APPLICATIONS

This application is a national stage application of International Application No. PCT/CN2017/089002 filed on Jun. 19, 2017, which claims priority to Chinese Patent Application No. 201710011116.9, filed on Jan. 6, 2017. Both of the aforementioned applications are hereby incorporated by reference in their entireties.

TECHNICAL FIELD

The present invention relates to the field of wireless communications, and in particular, to a method and a device for sending a wake-up frame and a method and a device for receiving a wake-up frame.

BACKGROUND

The IEEE 802.11 standards organization plans to formulate a IoT standard that is based on a 2.4 GHz/5 GHz frequency band, and basic features of the Wi-Fi IoT standard are low power consumption and a long distance. For the low power consumption feature, a possible method is using a low power (Lower Power, LP) wake-up radio (wake-up radio, WUR) on a Wi-Fi IoT device side. The wake-up radio is also referred to as a wake-up receiver (wake-up receiver, WUR). The wake-up radio is used as a unified name in descriptions of the present invention. Currently, a study group (Study Group) has been founded for a WUR standard of the IEEE 802.11, and a task group (Task Group) of the study group may be named 802.11ba. In other words, 802.11ba may be an official name of the IEEE 802.11 WUR standard.

The WUR means that an LP-WUR interface is introduced on a basis that a conventional Wi-Fi interface (802.11 main radio, 802.11 main radio) is configured on a device, as shown in FIG. 1. The 802.11 main radio is usually in an off mode, and only when receiving a wake-up signal from an LP-WUP, the 802.11 main radio is activated and then performs data communication with an AP. An LP-WUP of a STA remains in a receiving state or intermittently enters a receiving state. When receiving a wake-up frame (Wake-up Packet, also referred to as a wake-up frame) from the AP, the LP-WUR sends a wake-up signal to the 802.11 main radio, to wake up the 802.11 main radio that is in the off mode. Logically, an AP side actually includes an 802.11 main radio and a WUR module. However, for current 802.11 standards, the 802.11 main radio is usually an OFDM wideband transmitter, but a WUR wake-up signal is a narrowband signal. To reduce costs and make a structure simple, the OFDM wideband transmitter may be used to generate a narrowband. WUR wake-up signal. For example, some subcarriers of an OFDM signal are unoccupied, and a signal is transmitted only on narrowband corresponding to a WUR wake-up signal, to generate a narrowband signal. This is an example in which the OFDM wideband transmitter is used to generate a WUR narrowband signal. Therefore, the AP side in the figure includes only one module. It should be specially noted that in specific implementation of the AP side, the 802.11 main radio and the WUR module may be alternatively implemented separately. In addition, either of the AP and the STA in FIG. 1 has only one antenna, so that the 802.11 main radio and the WUR module may share a same antenna when using carriers in a same frequency band (for example, 2.4 GHz), to reduce costs and simplify a device structure. However, when the 802.11 main radio and the WUR module use carriers in different frequency bands, different antennas should be configured for the 802.11 main radio and the WUR module. For example, the 802.11 main radio uses the 5 GHz frequency band, and the WUR module uses the 2.4 GHz frequency band. In this case, the 802.11 main radio and the WUR module should correspond to different antennas.

The STA consumes less power by using the WUR instead of the 802.11 main radio to receive a signal. This is mainly because receiving and decoding of a wake-up frame are much simpler than receiving and decoding of a conventional 802.11 frame. The wake-up frame usually uses a modulation scheme that is easy for demodulation by a receiving device, for example, on-off-keying (on-off key, OOK) modulation. The OOK modulation is used as an example, and the receiving device determines, based on whether there is energy, information carried in a received signal. For example, if there is energy, the information is 1; or if there is no energy, the information is 0. Because a sending device performs OFDM, BCC/LDPC, and the like on the conventional 802.11 frame, correspondingly, the receiving device needs to perform complex signal processing operations such as FFT and FEC decoding, and these operations need to consume a lot of energy.

The 802.11 main radio of the STA in FIG. 1 may be alternatively another communications interface, for example, an LTE communications interface. A module for data communication is collectively referred to as a main communications module or a main communications interface (main radio), for example, an LTE module or a Wi-Fi module. A module for device wake-up is collectively referred to as a wake-up RF module or a wake-up RF interface (WUR).

A manuscript [11-16-0341-00-lrlp-low-power-wake-up-receiver-follow-up] puts forward a specific PFDU design of a wake-up frame, as shown in FIG. 2. An L-STF, an L-LTF, and an L-SIG are an 802.11 legacy preamble (legacy preamble. L-Preamble for short) part, are sent in a bandwidth of 20 MHz (or an integer multiple of 20 MHz) in an OFDM mode, and are used for backward compatibility, so that a conventional Wi-Fi device can determine that a current packet is a Wi-Fi packet, and therefore select a corresponding channel to listen to a CCA decision threshold. If the backward compatibility is not considered, the L-STF, the L-LTF, and the L-SIG may not exist. A payload (WUR Payload) part of the wake-up frame uses a modulation scheme that is easy for demodulation, for example, OOK modulation (specifically, such as ASK), and may be transmitted in narrower bandwidth, for example, a 2 MHz channel, a 4 MHz channel, or a 5 MHz channel (minimum bandwidth of conventional Wi-Fi is 20 MHz), so that the receiving device consumes less energy. The WUR payload includes a wake-up preamble and a MAC part. The wake-up preamble is similar to an STF, an LTF, and an SIG in conventional Wi-Fi, and is used for synchronization, AGC, channel estimation, control information indication, and the like. The MAC part is similar to a MAC part of a conventional Wi-Fi frame, and further includes a MAC header (MAC Header), a frame body (Frame Body), and a frame check sequence (FCS). Simple channel coding may be performed on the MAC part in a mode such as repetition code, spreading code, or Manchester code, to improve reliability. However, channel coding may alternatively not be performed Because a function of the wake-up frame (also referred to as a wake-up packet) is relatively simple, the frame body part may alternatively not exist. The wake-up preamble includes a specific sequence, and the WUR of the STA does not receive the preceding legacy preamble part but directly detects the specific sequence to identify a start of the wake-up frame. When receiving the wake-up frame and detecting an identifier (a unicast, multicast broadcast address) of the WUR of the STA in the MAC part of the wake-up frame, the WUR of the STA sends a wake-up signal to the 802.11 main radio. The wake-up preamble may further include a wakeup-signal (Wakeup-Signal, WU-SIG) field that is used to carry a length of the MAC part, a used modulation and coding scheme, and the like. In addition to OOK, the WUR payload part may alternatively use another modulation scheme that is easy for demodulation, for example, FSK.

The foregoing PPDU structure shown in FIG. 2 is only an example of a PPDU carrying a wake-up frame. Another structure may be alternatively used, provided that the PPDU can be received by the WUR interface. A PPDU that can be received by the WUR interface is collectively referred to as a WUR PPDU. The WUR PPDU may be used to carry not only a wake-up frame but also another frame that may be received by the WUR interface, for example, a synchronization frame used for WUR synchronization.

It should be specially noted that a sending device of a wake-up frame may be an AP, and a receiving device is a terminal device equipped with a WUR, for example, a mobile phone or a sensor; or a sending device of a wake-up frame may be a terminal device, for example, a mobile phone, and a receiving device is another terminal device equipped with a WUR, for example, a smartwatch or a smart band; or a sending device of a wake-up frame may be a terminal device, for example, a mobile phone, and a receiving device is an AP equipped with a WUR; or a sending device of a wake-up frame may be a terminal device, for example, a smartwatch or a smart band, and a receiving device is a terminal device equipped with a WUR, for example, a mobile phone. In short, a sending device of a wake-up frame needs to have a capability of sending a WUR PPDU, and a receiving device needs to be equipped with a WUR interface, to receive the WUR PPDU. For ease of description, in this application, an AP represents a sending device of a WUR PPDU, and a STA represents a receiving device of the WUR PPDU, but the AP and the STA do not represent specific product forms of the sending device and the receiving device.

If a WUR of a STA remains in an activated state for a long time, obviously, a lot of power is consumed. A trade-off method is that the WUR intermittently enters the activated state. A time window in which the WUR of the STA is in the activated state is referred to as a wake-up window (Wakeup window). Appearance of the wake-up window should be regular, so that an AP can know a time when the WUR of the STA can receive a wake-up frame. The wake-up window of the WUR of the STA may be referred to as a wake-up window of the STA for short. Such a working mode of the WUR of the STA is also referred to as a duty cycle (duty cycle) mode. For example, the WUR is in the activated state in 2 ms in every 100 ms. To be specific, a duty cycle period is 100 ms, and a length of the wake-up window is 2 ms, as shown in FIG. 3. When the AP needs to send data to the STA, the AP may send a wake-up frame in the wake-up window of the STA, to wake up an 802.11 main radio of the STA. Certainly, the wake-up window may alternatively not be introduced. In other words, the WUR of the STA is always in a listening state, so that the AP can wake up the STA at any time. This helps reduce a wake-up delay, but a disadvantage is that the STA consumes more energy.

When the WUR of the STA uses the duty cycle mode shown in FIG. 3, a wake-up frame sent by the AP needs to be in the wake-up window of the STA, so that the wake-up frame can be received by the STA, thereby waking up the STA. This means that the WUR of the STA needs to be synchronized with the AP. In other words, the AP needs to periodically send a synchronization frame in a WUR PPDU format. Otherwise, a clock drift caused by a crystal oscillator difference between the STA and the AP makes the AP incapable of estimating a location of the wake-up window of the STA. Such a wake-up frame sending manner based on synchronization may be referred to as synchronous wake-up. It is assumed that the length of the wake-up window is 2 ms. Estimated based on clock drift precision of a crystal oscillator of a current Wi-Fi device, a maximum period of sending a WUR synchronization frame by the AP is about a few seconds, so that it can be ensured that the STA is synchronized with the AP. When data from the AP is relatively frequent, a synchronous wake-up manner achieves a relatively good effect. However, if the AP only needs to send cached data to the STA after a long time, the synchronous wake-up manner causes the AP to send a large quantity of unnecessary WUR synchronization frames to maintain synchronization with the STA. This causes the AP to consume extra power. In addition, because a synchronization frame consumes a relatively long time (about hundreds of microseconds), sending of a large quantity of synchronization frames occupies many media resources, thereby reducing media resource utilization. Especially in a scenario in which BSSs are densely distributed, a plurality of adjacent APs need to send WUR synchronization frames, and consequently, a channel is full of a large quantity of WUR synchronization frames. This greatly reduces media utilization and seriously affects communication of conventional Wi-Fi (or a main communications interface).

A solution to overcome a problem that media utilization is reduced because the AP periodically sends a synchronization frame in synchronous wake-up is: The AP does not periodically send a WUR synchronization frame, but sends a plurality of wake-up frames in succession when needing to send cached data to the STA, to wake up the STA.

As shown in FIG. 4, because an AP does not know a location of a wake-up window of a WUR of a STA, when data of an associated STA arrives at the AP, the AP contends for a channel and then sends wake-up frames in succession. It should be noted that "sending wake-up frames in succession" herein means that the AP sends a plurality of wake-up frames, but the AP needs to contend for a channel before sending each wake-up frame, and a time resource between two adjacent wake-up frames may still be used by another device or be used by the AP to perform transmission with another STA. A time interval Δt between adjacent wake-up frames should not exceed a length of the wake-up window of the STA, to ensure that these wake-up frames do not miss the wake-up window of the STA in one duty cycle period T, thereby minimizing a delay of a wake-up process. When receiving a wake-up frame from an associated AP in the wake-up window of the STA, the STA immediately wakes up a main communications interface of the STA and sends a wake-up acknowledgement message such as a PS-Poll (Power Saving Poll, power save poll) frame to the AP by using the main communications interface.

In comparison with synchronous wake-up, a manner that is shown in FIG. 4 and in which no synchronization frame needs to be sent and the AP sends a series of wake-up frames only when needing to transmit data may be referred to as asynchronous wake-up. Although the AP needs to send a plurality of wake-up frames in the asynchronous wake-up manner, for a scenario in which data is not frequently sent, a quantity of these wake-up frames is far less than a quantity of periodic synchronization frames in the synchronous wake-up manner, and in other words, fewer channels are occupied. Therefore, in the scenario, asynchronous wake-up occupies less media, and saved resources may be used for communication of a Wi-Fi interface (or a main communications interface), thereby improving media utilization.

Because a WUR PPDU uses low-speed modulation such as OOK, even if the WUR PPDU carries a little data, one WUR PPDU occupies a very long time. It is estimated that transmission of one WUR PPDU may last for hundreds of microseconds, for example, 500 μs. If the WUR PPDU uses spreading code or another coding scheme to improve transmission reliability, a transmission time of the WUR PPDU is longer. It is assumed that a length of a wake-up window of a WUR is 2 ms, and a length of a WUR PPDU carrying a wake-up frame is 500 μs. In an asynchronous wake-up process, 25% time resources are occupied by the wake-up frame, and the entire process may last for hundreds of milliseconds (on a same order of magnitude as a duty cycle period). Therefore, there is a problem that media occupation is high, and during the time, communication of Wi-Fi (or a main communications interface) is still affected seriously. When BSSs are dense, the problem is more serious. The BSS is a network system including an access point and a device associated with the access point.

SUMMARY

Embodiments of the present invention put forward a method for sending a wake-up frame and a method for receiving a wake-up frame, to reduce transmission overheads of a wake-up frame in an asynchronous wake-up manner, and further reduce impact of sending a plurality of wake-up frames in the asynchronous wake-up manner on media utilization.

The embodiments provided in the present invention include any one of the following items:

1. A method for sending a wake-up frame, where the method includes:

generating, by a sending device, a plurality of short wake-up frames, where each of the plurality of short wake-up frames includes an index and an address segment, the index is used to indicate a number of the address segment, the plurality of short wake-up frames include at least N short wake-up frames whose indexes are different from each other, N is a positive integer, and N≥2; and sending, by the sending device, the plurality of short wake-up frames, so that a receiving device can determine, based on N address segments carried in any N short wake-up frames whose indexes are different from each other in the plurality of short wake-up frames, whether the receiving device is a target wake-up device of the sending device.

Each of the plurality of short wake-up frames sent by the sending device carries the address segment instead of a complete address field, so that a transmission time of the wake-up frame can be significantly reduced, and more media resources are saved for data transmission, thereby improving media utilization.

2. The method according to 1, where each of the plurality of short wake-up frames includes a short frame indication that is used to indicate that the short wake-up frame includes the index and/or the address segment.

If a long wake-up frame (namely an existing wake-up frame) and a short wake-up frame are allowed to coexist in a standard, a wake-up frame needs to carry a short frame indication that is used to differentiate whether the current wake-up frame is a long wake-up frame or a short wake-up frame. For different types of wake-up frames, the receiving device has different processing manners. The short wake-up frame in this specification is relative to the existing wake-up frame, and a length or a transmission time of the short wake-up frame is less than that of the existing wake-up frame. For example, the existing wake-up frame carries a complete address field and is referred to as the long wake-up frame in this specification. For address information, the short wake-up frame in this specification includes only an address segment and does not carry a complete address field. In comparison with the long wake-up frame, the short wake-up frame has a shorter length and may be referred to as the short wake-up frame.

3. The method according to 1 or 2, where before generating the plurality of short wake-up frames, the sending device divides an address field into N address segments and determines different indexes for the address segments, and the address field includes at least one of the following addresses: an address of the sending device, an address of the target wake-up device, and an identifier of a network to which the sending device belongs.

Address segments and corresponding indexes that are carried in the plurality of short wake-up frames sent by the sending device need to be generated in advance.

4. The method according to any one of 1 to 3, where each short wake-up frame includes a time indication that is used to indicate a target sending time of a next short wake-up frame.

The receiving device may determine a target sending time of a next short wake-up frame based on a time indication in a current short wake-up frame. During a time between the two short wake-up frames, the receiving device may enter a dormant state, to save more power.

5. The method according to any one of 1 to 4, where each short wake-up frame includes a first token value that is used to identify a current wake-up process, and the plurality of short wake-up frames include a same first token value.

The first token value is used to differentiate different wake-up processes, and the receiving device combines address segments included in short wake-up frames that carry a same first token value, thereby avoiding an error that is caused by combining address segments of different wake-up processes.

6. The method according to any one of 1 to 5, where the quantity N of address segments is a predefined value, or N is obtained through negotiation by the sending device and the target wake-up device.

If N is the predefined value, signaling overheads required by the sending device and the target wake-up device to negotiate N are avoided. If N is obtained through negotiation, an asynchronous wake-up process based on the short wake-up frames is more flexible.

7. A method for receiving a wake-up frame, where a receiving device periodically works in an activated state and a dormant state, and the method includes:

receiving, by the receiving device, a short wake-up frame in a wake-up window, where the wake-up window is a time domain window in which the receiving device is in the activated state:

determining, by the receiving device, whether the short wake-up frame matches the receiving device; and if the short wake-up frame matches the receiving device, continuing, by the receiving device, to receive V subsequent short wake-up frames, and determining, based on the V subsequent short wake-up frames, whether the receiving device is a target wake-up device in a current wake-up process, where V≤N−1, V and N are positive integers, N≥2, and V≥1, and where each short wake-up frame includes an index and an address segment, the index is used to indicate a number of the address segment, indexes included in the V+1 short wake-up frames are different from each other, and the determining, by the receiving device, whether the short wake-up frame matches the receiving device includes: when the address segment carried in the short wake-up frame is the same as a corresponding address segment stored in the receiving device, determining, by the receiving device, that the short wake-up frame matches the receiving device, where the corresponding address segment is an address segment that is stored in the receiving device and that has a same index as the address segment.

The plurality of short wake-up frames carry only the address segment instead of a complete address field, so that a transmission time of the wake-up frame can be significantly reduced, and more media resources are saved for data transmission, thereby improving media utilization.

8. The method according to 7, where each short wake-up frame includes a short frame indication that is used to indicate that the short wake-up frame includes the index and/or the address segment.

If two types of wake-up frames, namely a long wake-up frame and a short wake-up frame, are allowed to coexist in a standard, a short frame indication carried in a wake-up frame may be used to differentiate whether the current wake-up frame is a long wake-up frame or a short wake-up frame. For different types of wake-up frames, the receiving device has different processing manners.

9. The method according to 7 or 8, where each short wake-up frame includes a first token value that is used to identify the current wake-up process, and the V+1 short wake-up frames include a same first token value.

The first token value is used to differentiate different wake-up processes, and the receiving device combines address segments included in a plurality of short wake-up frames that carry a same first token value, thereby avoiding an error that is caused by combining address segments of different wake-up processes.

10. The method according to any one of 7 to 9, where before the receiving device receives the short wake-up frame in the wake-up window, the receiving device generates N address segments and corresponding indexes based on an address field, and stores a mapping relationship between the address field, the address segments, and the indexes, and the address field includes at least one of the following addresses: a receiver address of the receiving device, an address of a device that is associated with the receiving device and that may send a short wake-up frame, and an identifier of a network to which the receiving device belongs.

The receiving device may generate and store receiver addresses and corresponding address segments and indexes in advance, so that the receiving device can perform comparison and matching after receiving the short wake-up frame.

11. The method according to any one of 7 to 10, where the determining, based on the V subsequent short wake-up frames, whether the receiving device is a target wake-up device in a current wake-up process includes:

if an address segment included in each of the V subsequent short wake-up frames is the same as the corresponding address segment stored in the receiving device, determining, by the receiving device, that the receiving device is the target wake-up device in the current wake-up process, where V=N−1, and the corresponding address segment is an address segment that is stored in the receiving device and that has a same index as the address segment.

This embodiment provides an example in which the receiving device determines, based on the plurality of received short wake-up frames, that the receiving device is the target wake-up device in the current wake-up process.

12. The method according to any one of 7 to 10, where the determining, based on the V subsequent short wake-up frames, whether the receiving device is a target wake-up device in a current wake-up process includes:

if an address segment included in any one of the V subsequent short wake-up frames is different from the corresponding address segment stored in the receiving device, or when a predefined time ends, if all address segments included in the V short wake-up frames are the same as the corresponding address segment stored in the receiving device, but V<N−1, determining, by the receiving device, that the receiving device is not the target wake-up device in the current wake-up process, where the corresponding address segment is an address segment that is stored in the receiving device and that has a same index as the address segment.

This embodiment provides two possible examples in which the receiving device determines, based on the plurality of received short wake-up frames, that the receiving device is not the target wake-up device in the current wake-up process.

13. The method according to any one of 7 to 12, where the quantity N of address segments is a predefined value, or N is obtained through negotiation by the receiving device and a first device, and the first device is a device that is associated with the receiving device and that may send a short wake-up frame.

If N is the predefined value, signaling overheads required by negotiating N are avoided. If N is obtained through negotiation, an asynchronous wake-up process based on the short wake-up frames is more flexible.

14. A device for sending a wake-up frame, where the device includes:

a processing module, configured to generate a plurality of short wake-up frames, where each of the plurality of short wake-up frames includes an index and an address segment, the index is used to indicate a number of the address segment, the plurality of short wake-up frames include at least N short wake-up frames whose indexes are different from each other, N is a positive integer, and N≥2; and a sending module, configured to send the plurality of short wake-up frames, so that a receiving device can determine, based on N address segments carried in any N short wake-up frames whose indexes are different from each other in the plurality of short wake-up frames, whether the receiving device is a target wake-up device of the device.

15. The device according to 14, where each of the plurality of short wake-up frames includes a short frame indication that is used to indicate that the short wake-up frame includes the index and/or the address segment.

16. The device according to 14 or 15, where the processing module is further configured to: before generating the plurality of short wake-up frames, divide an address field into N address segments and determine different indexes for the address segments, where the address field includes at least one of the following addresses: an address of the device, an address of the target wake-up device, and an identifier of a network to which the device belongs.

17. The device according to any one of 14 to 16, where each short wake-up frame includes a time indication that is used to indicate a target sending time of a next short wake-up frame.

18. The device according to any one of 14 to 17, where each short wake-up frame includes a first token value that is used to identify a current wake-up process, and the plurality of short wake-up frames include a same first token value.

19. The device according to any one of 14 to 18, where the quantity N of address segments is a predefined value, or N is obtained through negotiation by the device and the target wake-up device.

20. A device for receiving a wake-up frame, where the device includes:

a receiving module, configured to receive a short wake-up frame in a wake-up window of the device, where the wake-up window is a time domain window in which the device is in an activated state;

a processing module, configured to determine whether the short wake-up frame matches the device, where the determining whether the short wake-up frame matches the device includes: when the address segment carried in the short wake-up frame is the same as a corresponding address segment stored in the device, determining, by the processing module, that the short wake-up frame matches the device, where the corresponding address segment is an address segment that is stored in the device and that has a same index as the address segment, where the receiving module is further configured to: if the processing module determines that the short wake-up frame matches the device, receive V subsequent short wake-up frames, where V≤N−1, V and N are positive integers, N≥2, N≥1, each short wake-up frame includes an index and an address segment, the index is used to indicate a number of the address segment, indexes included in the V+1 short wake-up frames are different from each other, and the receiving module periodically works in the activated state and a dormant state;

the processing module is further configured to: before the receiving module receives the short wake-up frame in the wake-up window, generate N address segments and corresponding indexes based on an address field, where the address field includes at least one of the following addresses: a receiver address of the device, an address of a device that is associated with the device and that may send a short wake-up frame, and an identifier of a network to which the device belongs; and a storage module, configured to store a mapping relationship between the address field, the address segments, and the indexes, where the processing module is further configured to determine, based on the V subsequent short wake-up frames, whether the device is a target wake-up device in the current wake-up process.

21. The device according to 20, where each short wake-up frame includes a short frame indication that is used to indicate that the short wake-up frame includes the index and/or the address segment.

22. The device according to 20 or 21, where each short wake-up frame includes a first token value that is used to identify the current wake-up process, and the V+1 short wake-up frames include a same first token value.

23. The device according to any one of 20 to 22, where that the processing module determines, based on the V subsequent short wake-up frames, whether the device is a target wake-up device in the current wake-up process includes:

if an address segment included in each of the V subsequent short, wake-up frames is the same as the corresponding address segment stored in the device, determining, by the processing module, that the device is the target wake-up device in the current wake-up process, where V=N−1, and the corresponding address segment is an address segment that is stored in the device and that has a same index as the address segment.

24. The device according to any one of 20 to 22, where that the processing module determines, based on the V subsequent short wake-up frames, whether the device is a target wake-up device in the current wake-up process includes:

if an address segment included in any one of the V subsequent short wake-up frames is different from the corresponding address segment stored in the device, or when a predefined time ends, if all address segments included in the V short wake-up frames are the same as the corresponding address segment stored in the device, but V<N−1, the processing module determines that the device is not the target wake-up device in the current wake-up process, where the corresponding address segment is an address segment that is stored in the device and that has a same index as the address segment.

25. The device according to any one of 20 to 24, where the quantity N of address segments is a predefined value, or N is obtained through negotiation by the device and a first device, and the first device is a device that is associated with the device and that may send a wake-up frame.

26. A device for sending a wake-up frame, where the device includes:

a processor, configured to generate a plurality of short wake-up frames, where each of the plurality of short wake-up frames includes an index and an address segment, the index is used to indicate a number of the address segment, the plurality of short wake-up frames include at least N short wake-up frames whose indexes are different from each other, N is a positive integer, and N≥2; and a transceiver, configured to send the plurality of short wake-up frames, so that a receiving device can determine, based on N address segments carried in any N short wake-up frames whose indexes are different from each other in the plurality of short wake-up frames, whether the receiving device is a target wake-up device of the device.

27. The device according to 26, where each of the plurality of short wake-up frames includes a short frame indication that is used to indicate that the short wake-up frame includes the index and/or the address segment.

28. The device according to 26 or 27, where the processing module is further configured to: before generating the plurality of short wake-up flumes, divide an address field into N address segments and determine different indexes for the address segments, where the address field includes at least one of the following addresses: an address of the device, an address of the target wake-up device, and an identifier of a network to which the device belongs.

29. The device according to any one of 26 to 28, where each short wake-up frame includes a time indication that is used to indicate a target sending time of a next short wake-up frame.

30. The device according to any one of 26 to 29, where each short wake-up frame includes a first token value that is used to identify a current wake-up process, and the plurality of short wake-up frames include a same first token value.

31. The device according to any one of 26 to 30, where the quantity N of address segments is a predefined value, or N is obtained through negotiation by the device and the target wake-up device.

32. A device for receiving a wake-up frame, where the device includes:

a receiver, configured to receive a short wake-up frame in a wake-up window of the device, where the wake-up window is a time domain window in which the receiving device is in an activated state;

a processor, configured to determine whether the short wake-up frame matches the device, where the determining whether the short wake-up frame matches the device includes: when the address segment carried in the short wake-up frame is the same as a corresponding address segment stored in the device, determining, by the processor, that the short wake-up frame matches the device, where the corresponding address segment is an address segment that is stored in the device and that has a same index as the address segment, where the receiver is further configured to: if the processor determines that the short wake-up frame matches the device, receive V subsequent short wake-up frames, where V≤N−1, V and N are positive integers, N≥2, V≥1, each short wake-up frame includes an index and an address segment, the index is used to indicate a number of the address segment, indexes included in the V+1 short wake-up frames are different from each other, and the receiver periodically works in the activated state and a dormant state;

the processor is further configured to: before the receiver receives the short wake-up frame in the wake-up window, generate N address segments and corresponding indexes based on an address field, where the address field includes at least one of the following addresses: a receiver address of the device, an address of a device that is associated with the device and that may send a short wake-up flame, and an identifier of a network to which the device belongs; and a memory, configured to store a mapping relationship between the address field, the address segments, and the indexes, where the processor is further configured to determine, based on the V subsequent short wake-up frames, whether the device is a target wake-up device in the current wake-up process.

33. The device according to 32, where each short wake-up frame includes a short frame indication that is used to indicate that the short wake-up frame includes the index and/or the address segment.

34. The device according to 32 or 33, where each short wake-up frame includes a first token value that is used to identify the current wake-up process, and the V+1 short wake-up frames include a same first token value.

35. The device according to any one of 32 to 34, where that the processor determines, based on the V subsequent short wake-up frames, whether the device is a target wake-up device in the current wake-up process includes:

if an address segment included in each of the V subsequent short wake-up frames is the same as the corresponding address segment stored in the device, determining, by the processor, that the device is the target wake-up device in the current wake-up process, where V=N−1, and the corresponding address segment is an address segment that is stored in the device and that has a same index as the address segment.

36. The device according to any one of 32 to 34, where that the processor determines, based on the V subsequent short wake-up frames, whether the device is a target wake-up device in the current wake-up process includes:

if an address segment included in any one of the V subsequent short wake-up frames is different from the corresponding address segment stored in the device, or when a predefined time ends, if all address segments included in the V short wake-up frames are the same as the corresponding address segment stored in the device, but V<N−1, the processor determines that the device is not the target wake-up device in the current wake-up process, where the corresponding address segment is an address segment that is stored in the device and that has a same index as the address segment.

37. The device according to any one of 32 to 36, where the quantity N of address segments is a predefined value, or N is obtained through negotiation by the device and a first device and the first device is a device that is associated with the device and that may send a wake-up frame.

In comparison with the prior art, in the embodiments provided in this application, the transmission time of the wake-up frame can be effectively reduced, so that the wake-up frame occupies less media in the asynchronous wake-up manner, and more resources are saved for data transmission, thereby improving media utilization.

DESCRIPTION OF DRAWINGS

To describe technical solutions in embodiments of the present invention more clearly, the following briefly describes accompanying drawings required for describing the embodiments. Apparently, the accompanying drawings in the following description show merely some embodiments of the present invention.

DESCRIPTION OF EMBODIMENTS

The following describes the embodiments of the present invention with reference to accompanying drawings.

The terms used in the embodiments of the present invention are merely for the purpose of illustrating specific embodiments, and are not intended to limit the present invention. The terms "a" "said" and "the" of singular forms used in the embodiments and the appended claims of the present invention are also intended to include plural forms, unless otherwise specified in the context clearly. It should also be understood that, the term "and/or" used in this specification indicates and includes any or all possible combinations of one or more associated listed items. In addition, the character "/" in this specification generally indicates an "or" relationship between the associated objects.

It should be understood that although terms "first", "second", "third", and the like may be used in the embodiments of the present invention to describe various messages, requests, and terminals, the messages, the requests, and the terminals are not limited by the terms. These terms are only used to differentiate the messages, the requests, and the terminals. For example, without departing from the scope of the embodiments of the present invention, a first terminal may also be referred to as a second terminal, and similarly, the second terminal may also be referred to as the first terminal.

Depending on the context, for example, words "if" used herein may be explained as "while" or "when" or "in response to determining" or "in response to detection". Similarly, depending on the context, phrases "if determining" or "if detecting (a stated condition or event)" may be explained as "when determining" or "in response to determining" or "when detecting (the stated condition or event)" or "in response to detecting (the stated condition or event)".

Figure 5:
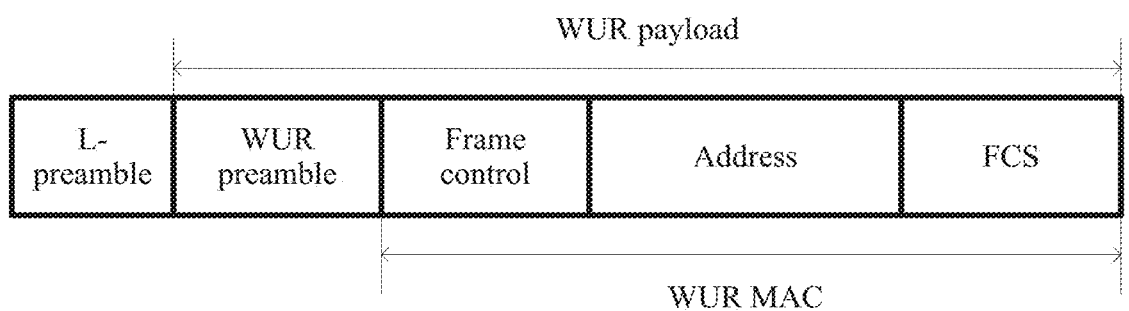
FIG. 5 is a schematic diagram of another frame structure of a PPDU of a wake-up frame in the prior art.

A WUR payload part of a WUR PPDU includes at least a WUR preamble and a WUR MAC part. The WUR preamble mainly includes a synchronization sequence used for ensuring receiving synchronization of a receiving device, and may further include a WU-SIG field that is used to indicate information such as a length or an MCS. The WUR MAC part includes at least a frame control field, an address field, and a frame check sequence. As shown in FIG. 5, specific functions of the fields included in the WUR MAC part may be as follows:

(1) Frame control (Frame Control) field: is used to carry a frame type and other indication information.

(2) Address (Address) field: includes at least one of a transmitter address, a receiver address, and a BSS identifier.

(3) Frame check sequence (Frame Check Sequence, FCS) field: carries check information, and is used to check the MAC part, for example, perform a CRC check on the frame control field and the address field.

Figure 1:
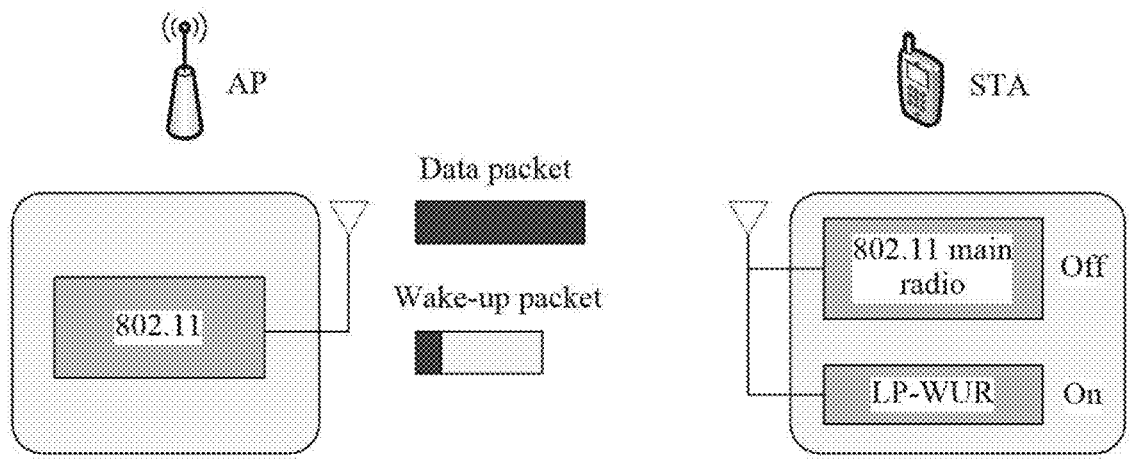
FIG. 1 is a schematic diagram of a method of WUR module interaction between an AP and a STA in the prior art.
Figure 2:
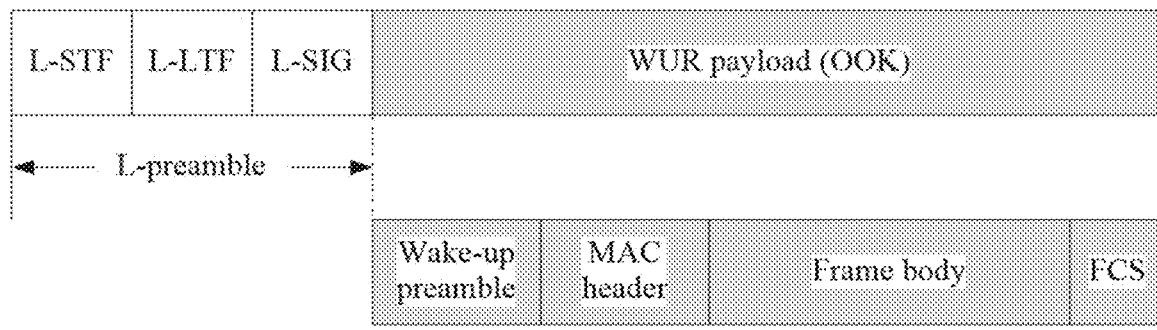
FIG. 2 is a schematic diagram of a frame structure of a PPDU of a wake-up frame in the prior art.
Figure 3:
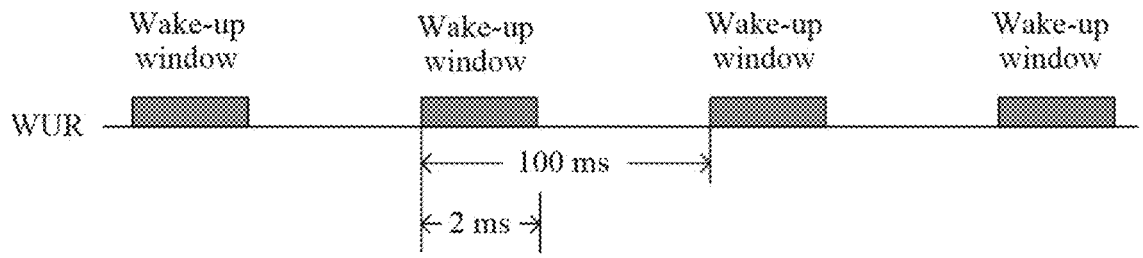
FIG. 3 is a schematic diagram of a duty cycle working mode of a WUR in the prior art.
Figure 4:
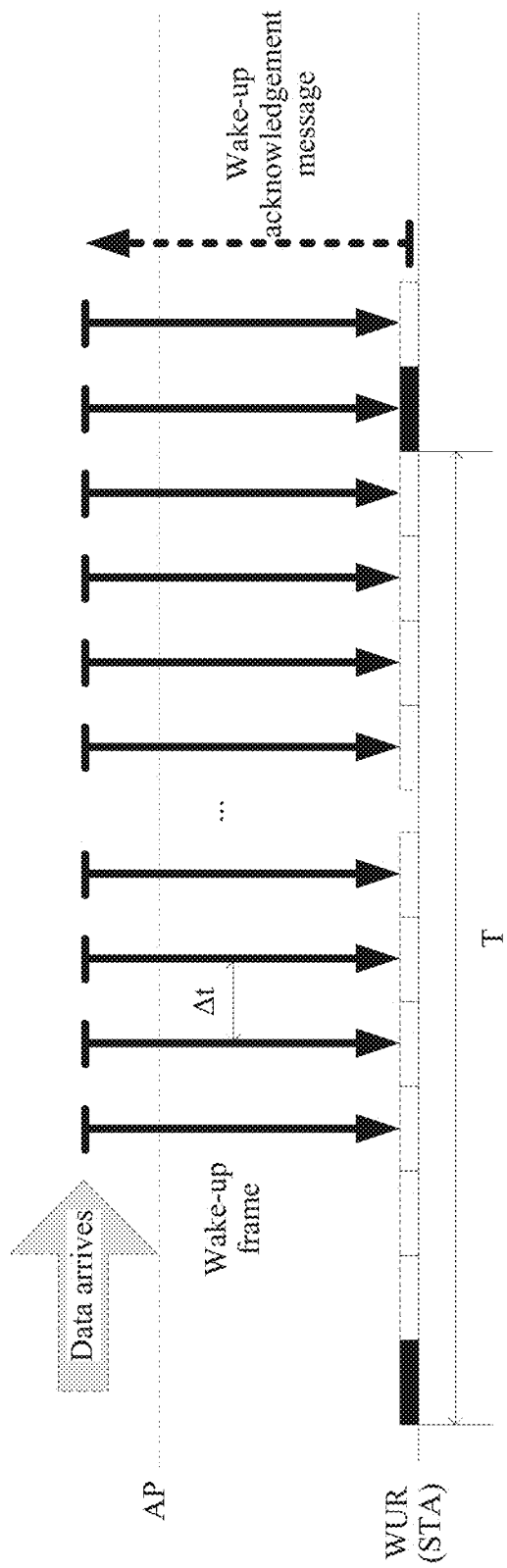
FIG. 4 is a schematic diagram of an asynchronous wake-up method in the prior art.

In comparison with FIG. 2, the frame control field and the address field in FIG. 5 may be considered as a MAC header, the FCS field corresponds to an FCS field in FIG. 2, and there is no frame body field. An L-preamble is sent in 20 MHz, and the WUR payload is sent in narrower bandwidth. The WUR MAC may further include another part, not shown in FIG. 5.

In comparison with the WUR preamble, the WUR MAC part is obviously longer. In the WUR MAC part, the address field obviously occupies a vast majority of a length. Therefore, even considering that there may be a legacy preamble (L-Preamble) before the WUR payload, a length of the address field still occupies a largest proportion in a transmission time of the entire WUR PPDU. It is assumed that the length of the address field is 64 bits, a length of the frame control field is 8 bits, and a length of the FCS is 16 bytes. In this case, a length of the WUR MAC part of a wake-up frame is 84 bits. It is assumed that transmission of each bit of the WUR MAC part needs 4 μs, and in this case, transmission of the WUR MAC part of the wake-up frame needs 336 μs. A transmission time of the L-preamble is 20 μs. It is assumed that a transmission time of the WUR preamble is 64 μs, and in this case, a transmission time of the wake-up frame is 420 μs. Therefore, a proportion occupied by the address field in the transmission time of the entire wake-up frame is (64×4)/424=60.4%.

Based on the foregoing analysis, an embodiment of the present invention puts forward a method for reducing transmission overheads of a wake-up frame. A basic idea of the method is: An address field is divided into N segments, each segment is referred to as an address segment (Address Segment), and each address segment has a different index (Index); and in an asynchronous wake-up manner, each wake-up frame sent by an AP only includes one address segment and a corresponding index, so that a length of the wake-up frame is effectively reduced.

When a STA receives such a wake-up frame in a wake-up window of the STA, compares an address segment and an index that are included in the wake-up frame with a corresponding address segment of the STA, and finds that the two address segments match, the STA continues to receive a subsequent address segment. When receiving N address segments whose indexes are different, the STA may restore a complete address field of the wake-up frame based on these address segments, to determine whether the STA is a target wake-up device in a current wake-up process. Certainly, if the STA receives an unmatched address segment before collecting all the N address segments whose indexes are different, the STA may skip receiving of a subsequent address segment and reenter a duty cycle mode. A value of N may be predefined, or may be obtained through negotiation with the AP by the STA by using a main radio before an asynchronous wake-up process based on a short wake-up frame is performed. If all the N address segments whose indexes are different and that are received by the STA match corresponding address segments stored in the STA, the STA believes that the STA is the target wake-up device in the current wake-up process.

For ease of description, in this application, a wake-up frame carrying a complete address field is referred to as a long wake-up frame, and a wake-up frame carrying an address segment is referred to as a short wake-up frame. The wake-up frame shown in FIG. 5 may be referred to as the long wake-up frame.

Figure 6:
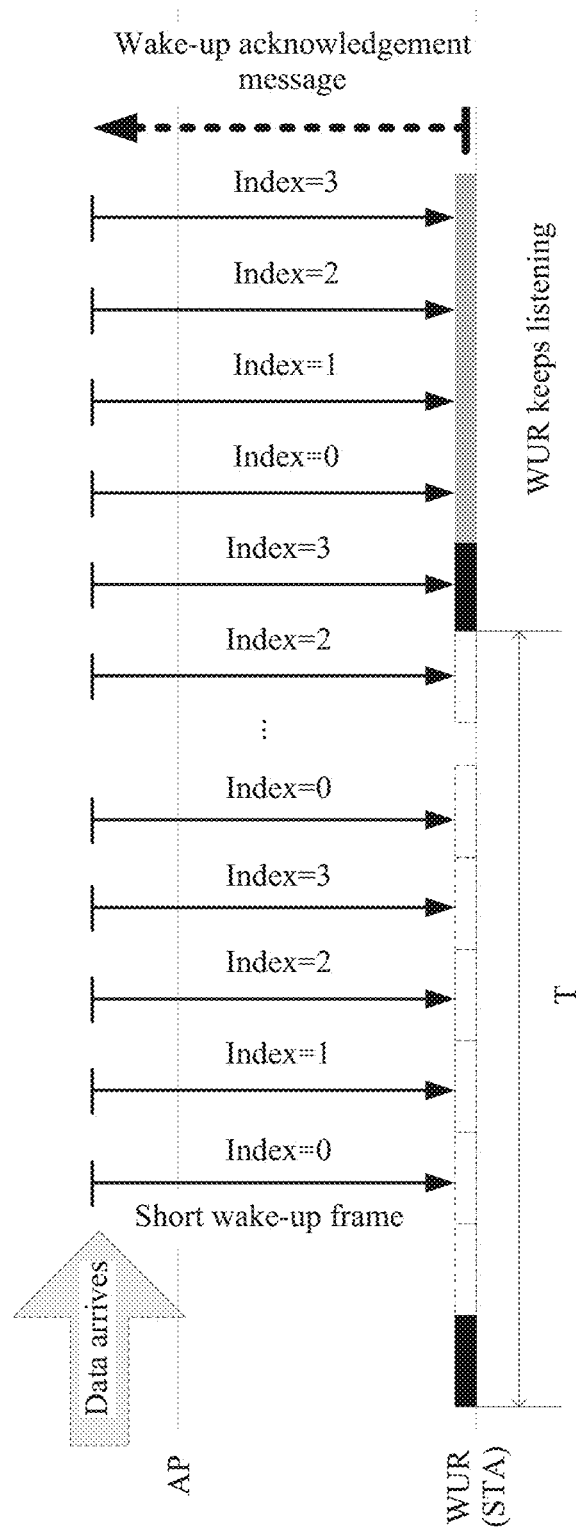
FIG. 6 is a schematic flowchart of sending and receiving a wake-up frame according to an embodiment of the present invention.

FIG. 6 shows an example of this application, where N=4, and indexes of four address segments are respectively 0, 1, 2, and 3. When data of a STA arrives at an AP, the AP sends a series of short wake-up frames in a WUR PPDU format until receiving a wake-up acknowledgement message (such as a PS-Poll frame or an ACK frame) sent by the STA by using a main radio, where short wake-up frames shown in FIG. 6 are alternately and recurrently sent in an order of carried address segment indexes 0, 1, 2, and 3. When the STA working in the duty cycle mode receives a short wake-up frame whose index is 3 in a wake-up window of the STA and finds that an address segment carried in the short wake-up frame matches an address segment whose index is 3 of the STA, a WUR interface no longer enters a dormant state but keeps listening on a channel, to receive a subsequent address segment. When the STA restores a complete address field based on the address segment whose index is 3 and subsequently received address segments whose indexes are 0, 1, and 2, and determines, based on the complete address field, that the STA is a target wake-up device in a current asynchronous wake-up process, the STA wakes up the main radio of the STA and sends a wake-up acknowledgement frame to the AP by using the main radio, indicating that the STA is woken up and the AP may send cached data. That the STA restores a complete address field based on the address segment whose index is 3 and subsequently received address segments whose indexes are 0, 1, and 2, and determines, based on the complete address field, that the STA is a target wake-up device in a current asynchronous wake-up process is equivalent to that the STA finds that all the four address segments whose indexes are different match address segments, stored in the STA, with corresponding indexes.

Figure 7A:
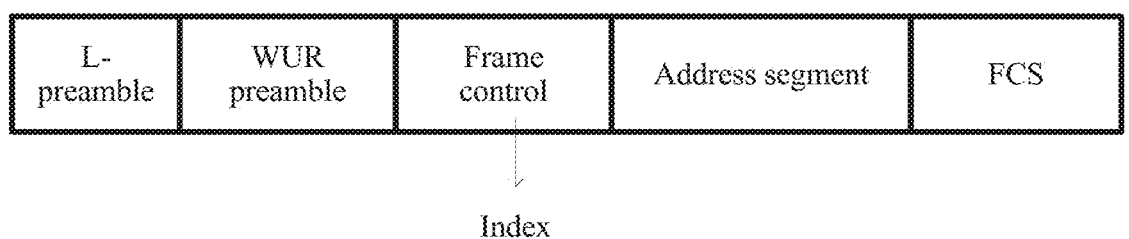
FIG. 7(a) is a schematic diagram of a frame structure of a short wake-up frame according to an embodiment of the present invention.
Figure 7B:
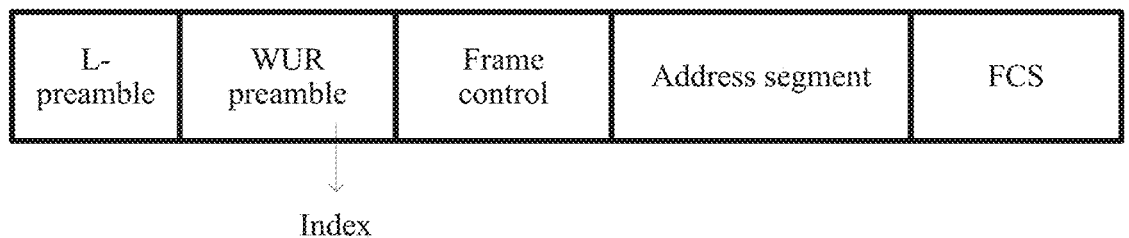
FIG. 7(b) is a schematic diagram of another frame structure of a short wake-up frame according to an embodiment of the present invention.

In a short wake-up frame, a WUR payload includes an index of an address segment carried in the short wake-up frame, and an address segment whose index is k is referred to as an address segment k. For example, the index of the address segment is located in a MAC header (for example, a frame control field), as shown in FIG. 7(a). For another example, the index of the address segment is located in a wake-up preamble, for example, located in a WU-SIG field in the wake-up preamble, as shown in FIG. 7(b).

It is assumed that a length of the complete address field is 64 bits, a length of the frame control field is 8 bits, and a length of an FCS is 16 bytes. In this case, a length of a WUR MAC part of a long wake-up frame is 84 bits. In the solution of this application, it is assumed that N=4, to be specific, a length of each segment is 16 bits, and the index is located in the frame control field. In this case, a length of the short wake-up frame is 40 bits. It is assumed that transmission of each bit of the WUR. MAC part needs 4 μs. In this case, transmission of the WUR MAC part of the long wake-up frame needs 336 μs, and transmission of a WUR MAC part of the short wake-up frame needs 160 μs. A transmission time of an L-preamble is 20 μs. It is assumed that a transmission time of a WUR preamble is 64 μs. In this case, a transmission time of the long wake-up frame is 420 μs, and a transmission time of the short wake-up frame is 244 μs. In this case, the transmission time of the wake-up frame may be reduced by (420−244)/420=41.9% in the solution of this application. This significantly reduces media occupied by the wake-up frame, and saved media resources may be used for data transmission, so that media utilization can be greatly improved. If N is a larger value, to be specific, the address field is allowed to be divided into more segments, the transmission time of the wake-up frame may be further reduced.

English abbreviations used in this specification and corresponding English full names and Chinese translations are as follows:

| English abbreviation | Full English expression/ standard English term | Chinese expression/Chinese term |
| --- | --- | --- |
| ACK | Acknowledge | Acknowledgement |
| AGC | Automatic gain control | Automatic gain control |
| AP | Access point | Access point |
| ASK | Amplitude shift keying | Amplitude shift keying |
| BCC | Binary convolutional code | Binary convolutional coding |
| BSS | Basic service set | Basic service set |
| CRC | Cyclic redundancy check | Cyclic redundancy check |
| CPU | Central processing unit | Central processing unit |
| FCS | Frame check sequence | Frame check sequence |
| FEC | Forward error correction | Forward error correction |
| FFT | Fast Fourier transform | Fast Fourier transform |
| FSK | Frequency shift keying | Frequency shift keying |
| ID | Identifier | Identifier |
| IEEE | Institute of Electrical and Electronics Engineers | Institute of Electrical and Electronics Engineers |
| IFFT | Inverse fast Fourier transform | Inverse fast Fourier transform |
| IoT | Internet of Things | Internet of Things |
| L- | Legacy | Legacy |
| LDPC | Low-density parity check | Low-density parity-check |
| LP | Lower power | Low power |
| LTE | Long Term Evolution | Long Term Evolution |
| LTF | Long training field | Long training field |
| MAC | Medium Access Control | Medium Access Control |
| MCS | Modulation and coding scheme | Modulation and coding scheme |
| OFDM | Orthogonal frequency division multiplexing | Orthogonal frequency division multiplexing |
| OOK | On-off key | On-off-keying |

| English abbreviation | Full English expression/ standard English term | Chinese expression/Chinese term |
| --- | --- | --- |
| PPDU | Physical layer convergence procedure (PLCP) protocol data unit | Physical layer convergence procedure (PLCP) protocol data unit |
| PS | Power saving | Power saving |
| RA | Receiver address | Receiver address |
| SFI | Short frame indication | Short frame indication |
| SIG | Signal | Signal |
| STA | Station | Station |
| STF | Short training field | Short training field |
| TA | Transmitter address | Transmitter address |
| Wi-Fi | Wireless Fidelity | Wireless Fidelity |
| WUR | Wake-up radio/receiver | Wake-up radio/receiver |

Figure 8:
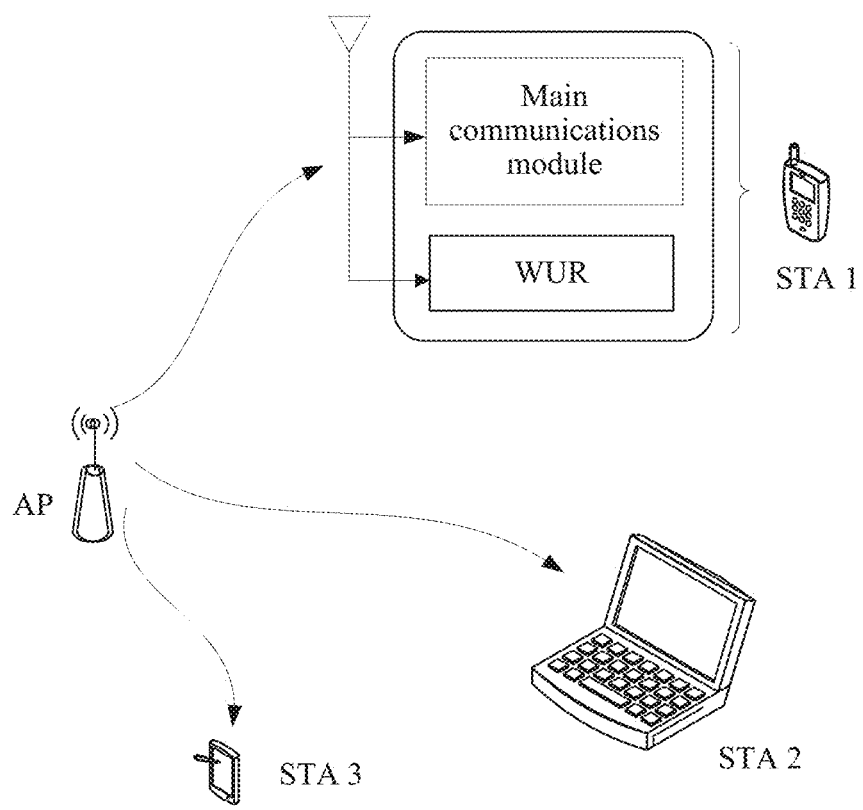
FIG. 8 is a schematic diagram of an application scenario according to an embodiment of the present invention.

In a scenario shown in FIG. 8, an AP can send a wake-up frame in a WUR PPDU format, and a STA associated with the AP includes a WUR STA configured with a WUR interface, for example, a STA 1, a STA 2, and a STA 3 in the figure. The WUR interface of the WUR STA is in a duty cycle mode, and in other words, the WUR interface of the WUR STA intermittently enters a woken-up state. The AP knows a duty cycle period and a wake-up window length of the STA. To reduce channels occupied by synchronization frames, the AP does not send periodic synchronization frames, but sends a series of wake-up frames only when needing to wake up a STA. In other words, the AP wakes up a device in an asynchronous wake-up manner. Due to a clock drift, the AP does not know a time domain location of a wake-up window of each STA.

Figure 9A:
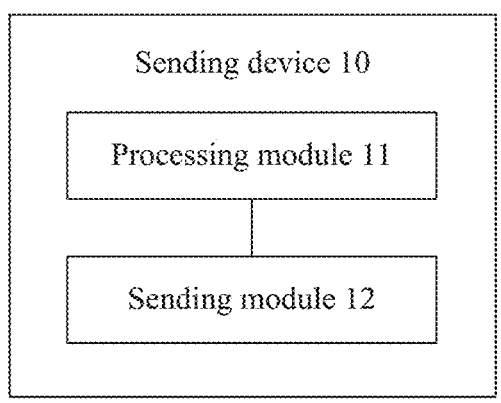
FIG. 9(a) is a schematic structural diagram of a device for sending a wake-up frame according to an embodiment of the present invention.

In an embodiment of this application, a device for sending a wake-up frame (hereinafter referred to as a sending device) may be the device according to any one of claims 14 to 19, and a structure of the device may be shown in FIG. 9(a). The sending device 10 may be configured to generate and send a plurality of short wake-up frames, and specifically includes two parts: a processing module 11, configured to generate a plurality of short wake-up frames, where each of the plurality of short wake-up frames includes an index and an address segment, the index is used to indicate a number of the address segment, and the plurality of short wake-up frames include at least N short wake-up frames whose indexes are different from each other; and a sending module 12, configured to send the plurality of short wake-up frames, so that a receiving device can determine, based on N address segments carried in any N short wake-up frames whose indexes are different from each other in the plurality of short wake-up frames, whether the receiving device is a target wake-up device of the sending device. Work of the processing module 11 may be completed in a processor, for example, completed in a CPU. The sending module 12 may be a main communications interface transmitter, and may include a sending circuit and an RF antenna. The sending circuit is configured to perform signal processing operations such as modulation, coding, and IFFT on a short wake-up frame, to generate a short wake-up frame in a WUR PPDU format. For example, the sending module 12 may be an OFDM wideband transmitter. As described in the background part, the OFDM wideband transmitter may be used to generate a narrowband WUR wake-up signal. Therefore, the OFDM wideband transmitter may be used to generate a wideband physical header part and a narrowband WUR payload part of a WUR PPDU. The sending module 12 may be alternatively a dedicated WUR transmitter, is implemented by an independent circuit, and may be configured to send a short wake-up frame in a WUR PPDU format. The sending device 10 may implement the solution according to any one of method claims 1 to 6. Further, the sending device 10 may further include a storage module, configured to store code and/or data. After the processing module 11 invokes the code and/or the data, the sending device may be enabled to perform a function that is performed by a sending device in the foregoing method embodiments, including the solution according to any one of method claims 1 to 6.

Figure 16:
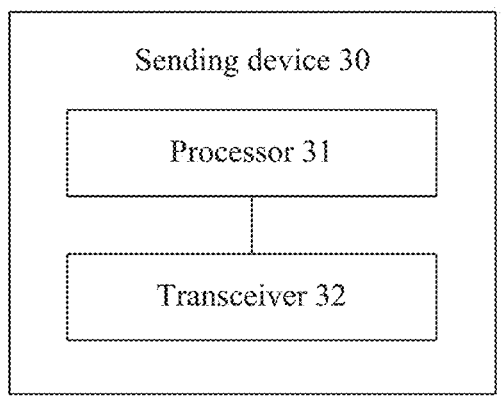
FIG. 16 is a schematic structural diagram of another device for sending a wake-up frame according to an embodiment of the present invention.

In another embodiment of this application, a device for sending a wake-up frame may be the device according to any one of claims 26 to 31, and a structure of the device may be shown in FIG. 16. The sending device 30 may include a processor 31 and a transceiver 32 (at least needing to have a function of sending the short wake-up frame), and the sending device 30 may implement the solution according to any one of method claims 1 to 6. The transceiver 32 may implement a function of the foregoing sending module 12. For a specific structure, form, and function of the transceiver 32, refer to related descriptions of the foregoing sending module 12. The processor 31 may implement a function of the foregoing processing module 11. For a specific function of the foregoing processing module 11, refer to related descriptions of the foregoing processing module 11. Further, the sending device 10 may further include a memory, configured to store code and/or data. After the processing module 11 invokes the code and/or the data, the sending device may be enabled to perform a function that is performed by a sending device in the foregoing method embodiments, including the solution according to any one of method claims 1 to 6.

Figure 9B:
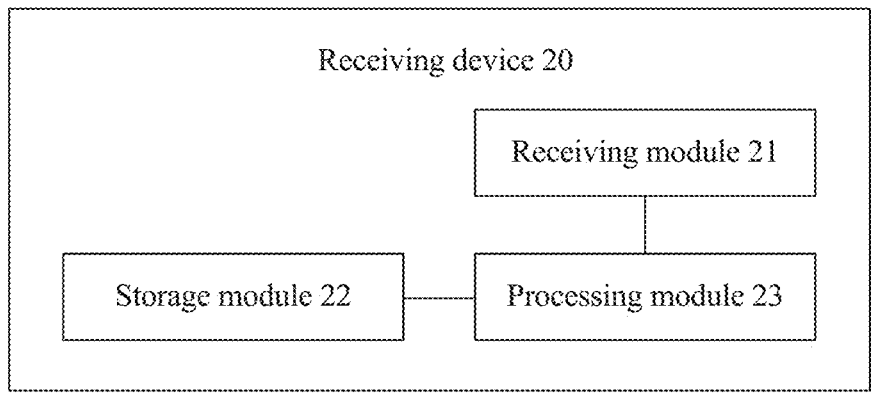
FIG. 9(b) is a schematic structural diagram of a device for receiving a wake-up frame according to an embodiment of the present invention.

In an embodiment of this application, a device for receiving a wake-up frame (hereinafter referred to as a receiving device) may be the device according to any one of claims 20 to 25, and a structure of the device may be shown in FIG. 9(b). The receiving device 20 may be configured to receive a plurality of short wake-up frames, and determine, based on these short wake-up frames, whether the receiving device 20 is a target wake-up device in a current wake-up process. The receiving device specifically includes three parts: a receiving module 21, configured to receive a short wake-up frame in a wake-up window of the device, where the wake-up window is a time domain window in which the device is in an activated state; a processing module 23, configured to determine whether the short wake-up frame matches the device, where the determining whether the short wake-up frame matches the device includes: when the address segment carried in the short wake-up frame is the same as a corresponding address segment stored in the device, determining, by the processing module 23, that the short wake-up frame matches the device, where the corresponding address segment is an address segment that is stored in the device and that has a same index as the address segment, and the receiving module 21 is further configured to: if the processing module 23 determines that the short wake-up frame matches the device, receive V subsequent short wake-up frames, where V≤N−1, V and N are positive integers, V≥2, V≥1, each short wake-up frame includes an index and an address segment, the index is used to indicate a number of the address segment, indexes included in the V+1 short wake-up frames are different from each other, and the receiving module 21 periodically works in the activated state and a dormant state; the processing module 23 is further configured to: before the receiving module receives the short wake-up frame in the wake-up window, generate N address segments and corresponding indexes based on an address field, where the address field includes at least one of the following addresses: a receiver address of the device, an address of a device that is associated with the device and that may send a short wake-up frame, and an identifier of a network to which the device belongs; and a storage module 22 that may store a mapping relationship between the address field, the address segments, and the indexes, where the processing module 23 is further configured to determine, based on the V subsequent short wake-up frames, whether the device is the target wake-up device in the current wake-up process. The receiving module 21 may be a WUR interface (to be specific, a communications interface provided by a WUR module). Work of the processing module 23 may be completed in a processor, for example, completed in a CPU. The work of the processing module 23 may be alternatively completed by using a dedicated circuit. The storage module 22 may be a cache, a hard disk, or the like. The storage module 22 may be further configured to store code and/or other data. After the processing module 23 invokes the code and/or data (which may include the other data and the mapping relationship between the address field, the address segments, and the indexes), the receiving device 20 may be enabled to perform a function that is performed by a receiving device in the foregoing method embodiments, including the solution according to any one of method claims 7 to 13.

Figure 17:
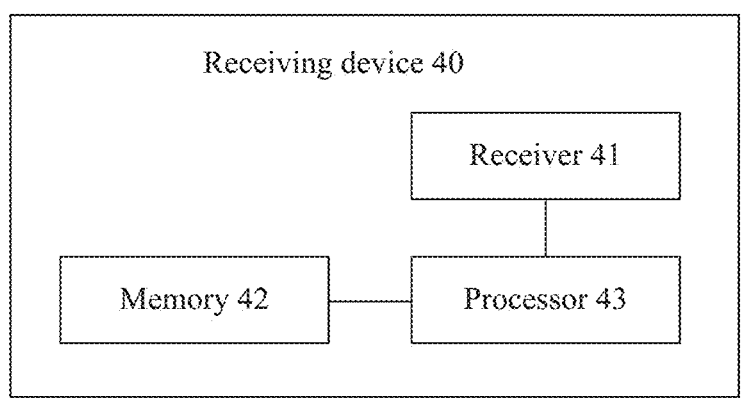
FIG. 17 is a schematic structural diagram of another device for receiving a wake-up frame according to an embodiment of the present invention.

In another embodiment of this application, a device for receiving a wake-up frame may be the device according to any one of claims 32 to 37, and a structure of the device may be shown in FIG. 17. The receiving device 40 may include a receiver 41 (at least needing to have a function of receiving the short wake-up frame), a memory 42, and a processor 43, and the receiving device 40 may implement the solution according to any one of method claims 7 to 13. The receiver 41 may implement a function of the foregoing receiving module 21. For a specific structure, form, and function of the receiver 41, refer to related descriptions of the foregoing receiving module 21. The memory 42 and the processor 43 may respectively implement functions of the storage module 22 and the processing module 23. For specific functions of the memory 42 and the processor 43, respectively refer to related descriptions of the storage module 22 and the processing module 23.

Address Field Segmentation Method

An address field of a long wake-up frame may be segmented to generate at least two address segments, to generate a corresponding short wake-up frame based on each address segment and a corresponding index. A specific segment generation manner and a segment parameter (for example, a length of each segment or a quantity of segments) may be predefined, or may be negotiated in advance by a STA and an AP by using a main radio (main radio, for example, an 802.11 main radio).

The address field of the long wake-up frame includes at least one of a transmitter address (Transmitter Address, TA), a receiver address (Receiver Address, RA), and a BSS identifier. Herein, an example in which an address field includes an RA field and a TA field is used to describe how to segment the address field into a plurality of segments. If the address field includes more or fewer subfields, a similar method may be used for processing, and details are not described again.

It is assumed that a length of the RA field is 48 bits, a length of the TA field is 12 bits, the RA field is before the TA field, N=4, to be specific, the address field is divided into four address segments, indexes of the four address segments are respectively 0, 1, 2, and 3, and lengths of the address segments are the same. The following describes some feasible methods in which address segments are generated from an address field.

(1) Division is performed on an entire address field as a whole.

Figure 10:
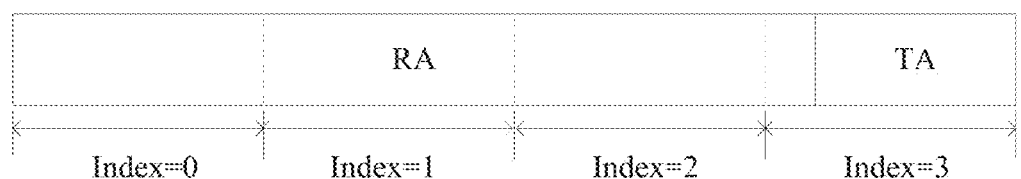
FIG. 10 is a schematic diagram of an address field segmentation method according to an embodiment of the present invention.

Division is performed on an entire address field as a whole, to generate N equal-length segments. As shown in FIG. 10, an address field has 60 bits in total, and is sequentially divided into four address segments whose lengths are all 15 bits. First three segments only include content of an RA, and a fourth segment includes content of both the RA and a TA.

Figure 11:
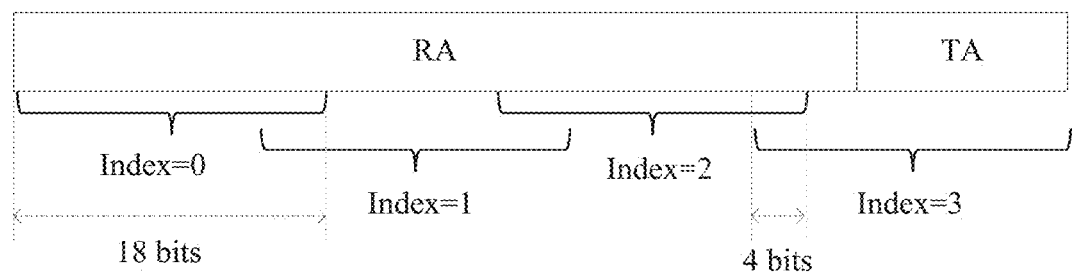
FIG. 11 is a schematic diagram of another address field segmentation method according to an embodiment of the present invention.

It should be noted that different segments may alternatively overlap. For example, the address field in FIG. 10 may be segmented in a manner shown in FIG. 11, a length of each address segment is 18 bits, and adjacent address segments have four overlapping bits. However, from a perspective of transmission, the non-overlapping manner shown in FIG. 10 is obviously more efficient. Based on this, other address field segmentation methods listed below are all described by using an example in which address segments do not overlap with each other. A manner that is similar to the manner shown in FIG. 11 and in which segments overlap is also feasible, but is not described in other methods.

(2) Division is performed on each subfield in an address field.

Figure 12:
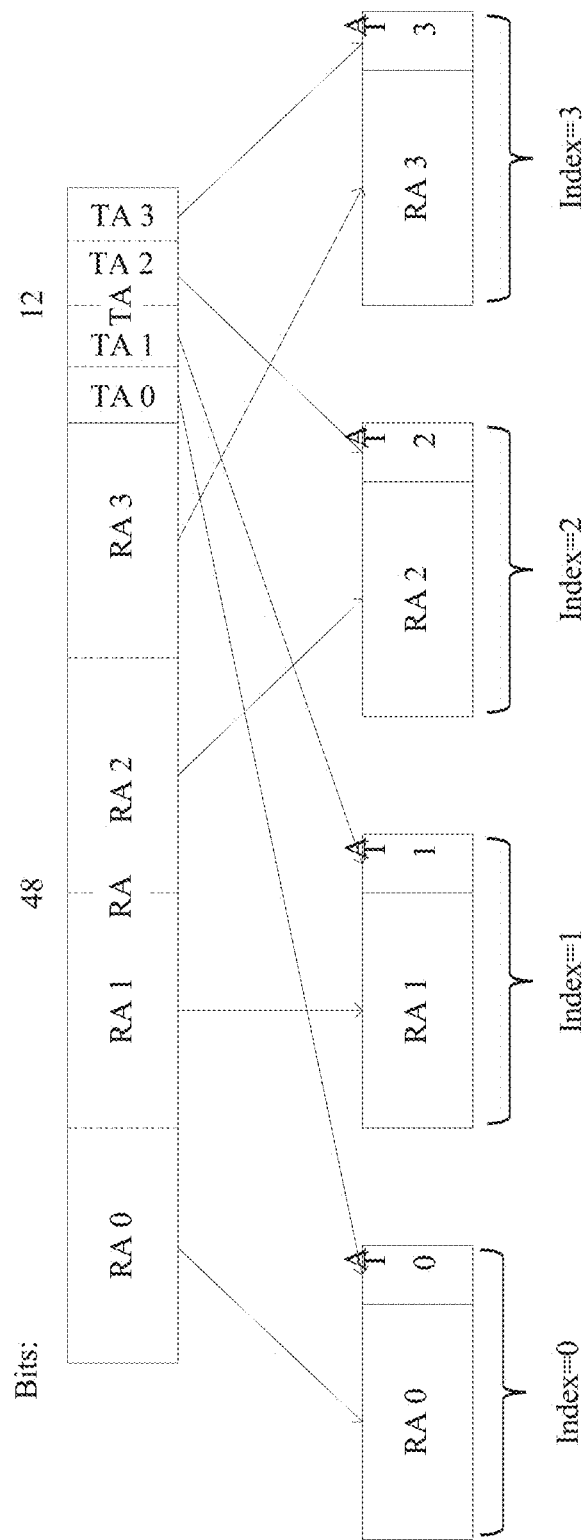
FIG. 12 is a schematic diagram of still another address field segmentation method according to an embodiment of the present invention.

If an address field includes a plurality of subfields, each subfield in the address field is divided into a plurality of parts, and one part is taken from the divided parts of each subfield, to form a segment. As shown in FIG. 12, an RA field in an address field is divided into N equal-length RA segments, and a TA field is divided into N equal-length TA segments, where N=4. Each RA segment is combined with one TA segment, to form a complete address segment. RA segments included in any two address segments are different from each other, and TA segments included in any two address segments are also different from each other. A length of each address segment is 15 bits, including a 12-bit RA segment and a 3-bit TA segment.

Figure 13:
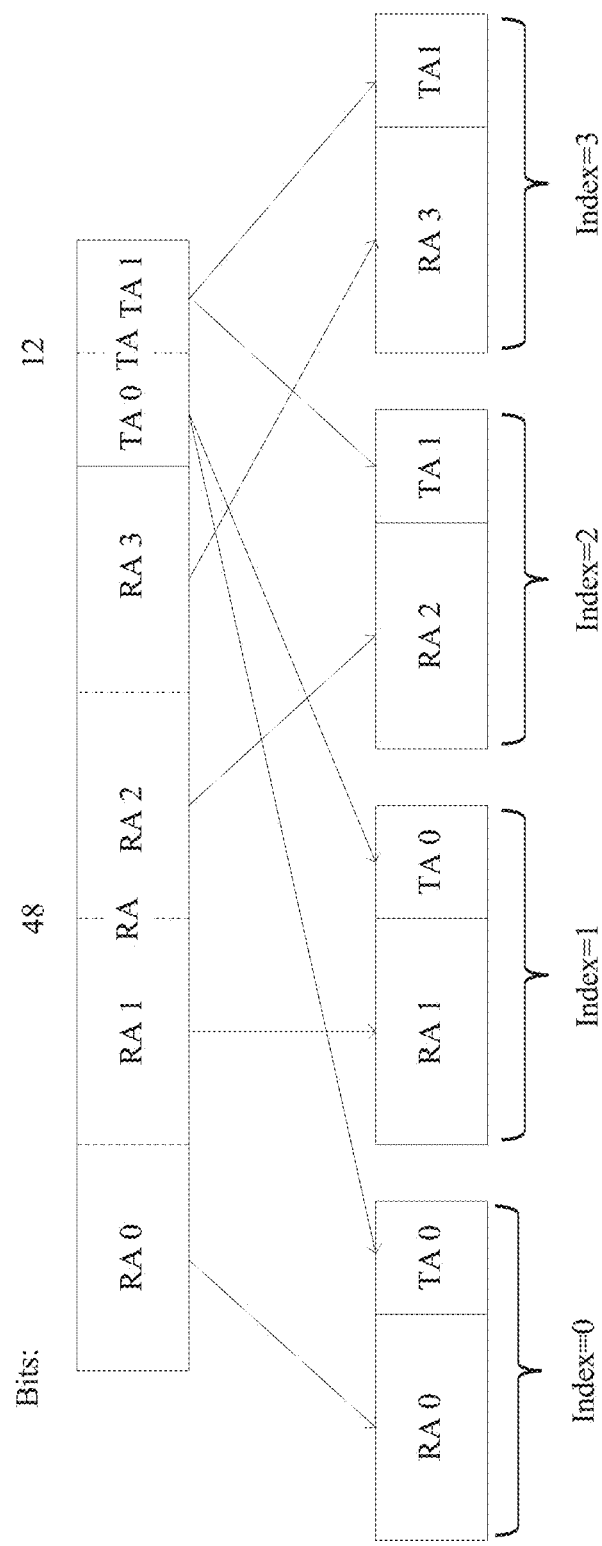
FIG. 13 is a schematic diagram of yet another address field segmentation method according to an embodiment of the present invention.

In the example shown in FIG. 12, both the RA field and the TA field are divided into N segments, and in other words, a quantity of segments of each subfield is the same as the quantity N of address segments. Actually, quantities of divided segments of different subfields may be alternatively different, and quantities of divided segments of some subfields may be less than the quantity of address segments. As shown in FIG. 13, an RA field is divided into four segments, and a TA field is divided into two segments. Finally, RA segments included in four address segments are different from each other, but TA field segments included in an address segment 0 and an address segment 1 are the same, and TA field segments included in an address segment 2 and an address segment 3 are the same. A length of each address segment is 18 bits, including a 12-bit RA segment and a 6-bit TA segment.

(3) Division is performed only on some subfields in an address field.

Figure 14:
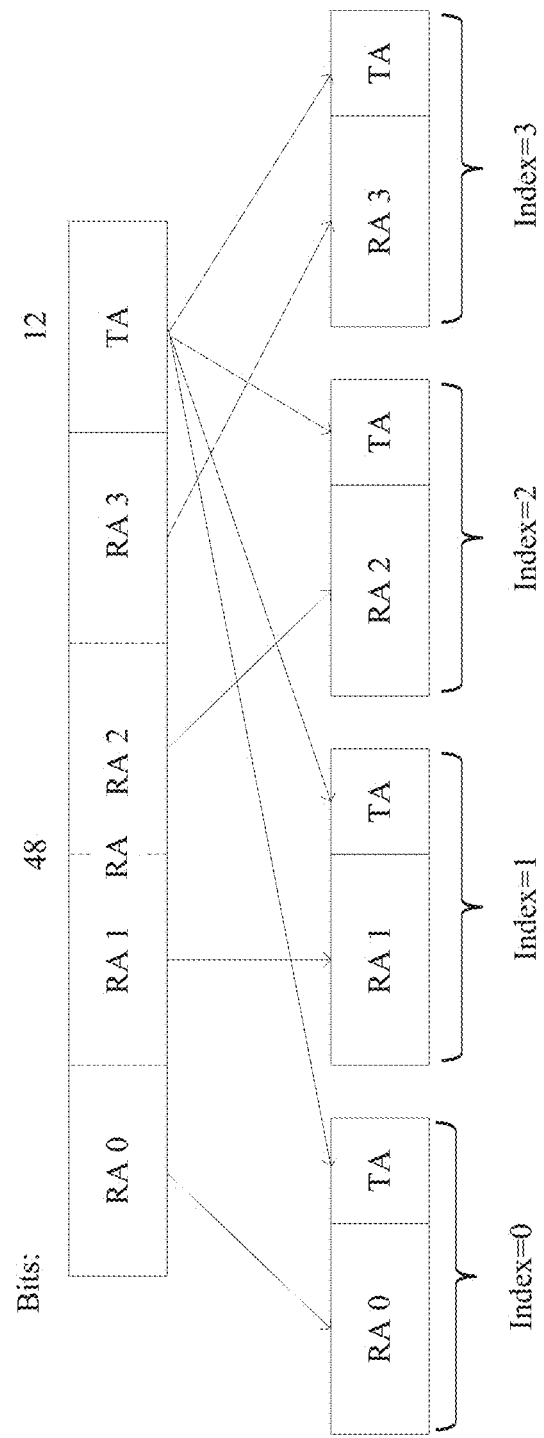
FIG. 14 is a schematic diagram of still yet another address field segmentation method according to an embodiment of the present invention.

If an address field includes a plurality of subfields, division may be performed only on some subfields in the address field, and some other subfields are carried in each address segment. As shown in FIG. 14, an RA field is divided into four equal-length RA segments, and a TA field remains unchanged. Each address segment includes one RA segment and the TA field, and RA segments in four segments are different from each other, but TA fields in the four segments are exactly the same. A length of each address segment is 24 bits, including a 12-bit RA segment and a 12-bit TA field.

Processing of a Sending Device

Serving as a sending device, an AP sends a short wake-up frame in a manner shown in FIG. 6. When sending each short wake-up frame, the AP needs to independently contend for a channel. A time interval between adjacent short wake-up frames should not exceed a length of a wake-up window of a STA as far as possible. Certainly, even if the time interval between adjacent short wake-up frames exceeds the length of the wake-up window of the STA, the STA can also be woken up, but more short wake-up frames need to be sent, thereby increasing a delay of an asynchronous wake-up process.

Short wake-up frames that are sent by the AP and that carry address segments may be sent in any order of index values, for example, alternately and recurrently sent in an order of index values 0 to 3 one by one (as shown in FIG. 6), or alternately and recurrently sent in an order of index values 1→0→3→2 one by one, or alternately and recurrently sent in an order of index values 00→22→33→11 (to be specific, two short wake-up frames with a same index are always sent in succession).

Short Frame Indication

If a long wake-up frame is also allowed to be sent in a WUR standard, an AP should differentiate the long wake-up frame and a short wake-up frame when sending a wake-up frame, and add an identifier to the sent wake-up frame. For example, a short frame indication (which may be referred to as Short Frame Indication, SFI) is carried during wake-up to indicate whether the current frame is a short wake-up frame. Several methods for implementing the short frame indication are as follows:

(1) Using a Frame Type for Indication

Figure 15:
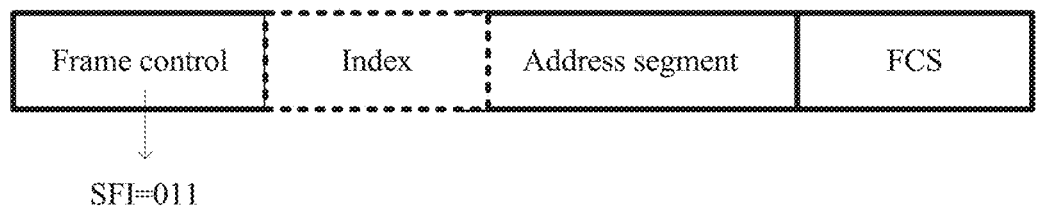
FIG. 15 is a schematic diagram of a frame structure of a WUR MAC part according to an embodiment of the present invention.

To be specific, a long wake-up frame is defined as one frame type, and a short wake-up frame is defined as another frame type. A frame type is usually indicated in a frame control field. For example, the frame type is indicated by using three bits, a value 010 of the frame type indicates a long wake-up frame, and a value 011 of the frame type indicates a short wake-up frame. In this case, the frame type is art SFI. As shown in FIG. 15, when SFI=011, a frame carries an address segment (Address Segment) instead of a complete address field. In addition, when SFI=011, the frame control field further includes an index of the carried address segment, or after the frame control field and before the address segment, there is an address segment index field that is used to carry an index of the carried address segment. When SFL≠11, there is no address segment index field, and a frame carries a complete address field (Address) instead of an address segment (Address Segment).

(2) Using One Bit in a Frame Control Field as an SFI

When a frame type in a frame control field indicates a wake-up frame, another bit in the frame control field indicates an SFI. For example, SFI=0 indicates that a current wake-up frame is a long wake-up frame, and the frame includes a complete address field; and SFI=1 indicates that a current wake-up frame is a short wake-up frame, and the frame includes an address segment. When the frame type indicates another type of frame, the bit may be used for another indication or used as a reserved bit. Likewise, when SFI=1, the frame control field further includes an index of the carried address segment, or after the frame control field and before the address segment, there is an address segment index field that is used to carry an index of the carried address segment.

(3) Using Different Index Values in a Frame Control Field to Indicate an SFI

For example, an index field that is in a frame control field and that is used to carry an address segment index has three bits; Index=000 indicates that a current frame is a long wake-up frame; and another index value indicates that the current frame is a short wake-up frame, and the index value indicates an index of an address segment carried in the current short wake-up flame. Certainly, if a plurality of frame types exist in a WUR, a prerequisite for parsing the index field based on the foregoing description is: A frame type in the frame control field indicates that the current frame is a wake-up frame.

Target Sending Time of a Next Short Wake-Up Frame

A short wake-up frame sent by an AP may further include a time indication that is used to indicate a target sending time of a next short wake-up frame. When receiving a short wake-up flame with a matched address segment, a STA may determine, based on a time indication carried in the frame, a sending time of a next short wake-up frame. In a time interval between the two short wake-up frames, the STA may enter a dormant state, to save more power. The target sending time of the next short wake-up frame is an earliest time when the AP sends the next short wake-up frame. In other words, a time when the AP sends the next short wake-up frame is not earlier than that time. Correspondingly, the STA should be woken up before or at that time, to receive the next short wake-up frame sent by the AP.

AP being Capable of Waking Up a Plurality of STAs at a Time

An asynchronous wake-up manner that is put forward by this application and that is based on a short wake-up frame is more applicable to a scenario in which one STA is woken up at a time. When an AP needs to wake up a plurality of STAs at a time, if the solution of the foregoing embodiment of this application is directly used, to be specific, some of a plurality of short wake-up frames sent by the AP are sent to a STA 1 and some are sent to a STA 2, this may cause the STA 1 to combine an address segment 1 of the STA 1 and an address segment 2 of the STA 2 to restore a complete address. Obviously, this causes an error to occur.

To enable this application to be applicable to a scenario in which an AP simultaneously wakes up a plurality of STAs, any one of the following methods may be used:

(1) It is stipulated that an AP can wake up only one STA at a time. In other words, a plurality of short wake-up frames continuously sent by the AP are necessarily sent to a same STA. When needing to wake up a plurality of STAs, the AP may wake up the STAs one by one. For example, the AP sends a short wake-up frame of a STA 2 only after receiving a wake-up acknowledgement message of a STA 1; or if no wake-up acknowledgement message of a STA 2 is received after a predefined time after a short wake-up frame of a STA 1 is sent, the AP sends a short wake-up frame of the STA 2.

(2) An AP and a group of STAs negotiate a multicast address in advance by using a main radio. When the AP needs to wake up the group of STAs, an RA field in an address field is the multicast address, the address field is segmented, and a corresponding short wake-up frame is sent.

(3) A short wake-up frame sent by an AP carries a first token (Token1) value that is used to identify a wake-up process of a STA. For example, the STA receives a plurality of short wake-up frames with Token1=3 and Token1=4, and when restoring a complete address field, combines only address segments whose first token values are the same. In this way, when sending short wake-up frames, the AP may send short wake-up frames of different STAs in a mixed manner. For example, the AP recurrently sends short wake-up frames in an order of STA1(1), STA2(3), STA1(2), STA2(4), STA1(3), STA2(1), STA1(4), and STA2(2). STA1(k) indicates an address segment that is sent by a STA 1 and whose index is k.

Processing of a Receiving Device

When a STA working in a duty cycle mode receives a short wake-up frame in a wake-up window of the STA, the STA determines, based on an address segment and a corresponding index that are carried in the short wake-up frame, whether the address segment matches the STA. Specifically, the STA needs to maintain a group of address segments and indexes corresponding to the address segments; when receiving a short wake-up frame, the STA compares an address segment carried in the short wake-up frame with an address segment with a same index in the group of address segments maintained by the STA and if the two address segments are the same, the STA believes that the address segment matches the STA; or otherwise, the STA believes that the address segment does not match the STA. For example, N=4, and the STA generates and stores four address segments based on a WUR ID (namely a receiving device address used by an AP to wake up the STA, which may be a MAC address of the STA) of the STA and an address of the AP. For example, as shown in Table 1, the STA generates four address segments based on a unicast address (an address 1) of the STA in combination with the address of the AP, and the four address segments correspond to a row in which the address 1 is located in the table. All address segments in Table 1 are represented in hexadecimal. When receiving a short wake-up frame carrying a segment whose index is 2, the STA compares the address segment carried in the short wake-up frame with a segment 2 (34F1) corresponding to the address 1 in Table 1, and if the two address segments are the same, the STA believes that the address segment matches the STA, and needs to continue to receive a subsequent segment.

TABLE 1

| Receiver address | Segment 1 | Segment 2 | Segment 3 | Segment 4 |
|---|---|---|---|---|
| Address 1 (unicast address) | 56EE | 34F1 | F227 | 06AC |
| Address 2 (broadcast address) | 8755 | 4432 | C560 | B991 |
| Address 3 (multicast address 1) | 9510 | 9EEF | 48D2 | 95FE |
| Address 4 (multicast address 2) | AC36 | 9EEF | 11A1 | 7522 |
| ... | ... | ... | ... | ... |
| Address M (multicast address M) | BB6C | 55D3 | 6815 | 7CEF |

Table 1 actually stores a mapping relationship between an address field, address segments, and address segment indexes. It should be specially noted that there may be a plurality of receiver addresses that are used by the AP to wake up one STA, for example, a unicast address of the STA, a broadcast address, and a multicast address of a multicast group that the STA joins (the STA may join a plurality of multicast groups). In this case, the STA may need to store address segments corresponding to a plurality of addresses, as shown in rows in Table 1. These address segments may be generated based on a predefined rule, for example, may be generated based on the foregoing receiver addresses in combination with another address (for example, the address of the AP). A rule for generating address segments based on the foregoing address field is known by both the AP and the STA.

When receiving an address segment whose index is k in the wake-up window, the STA should compare the address segment with values in all rows in a column corresponding to a segment k in Table 1. When the address segment in a short wake-up frame matches a value in any row in the column corresponding to the segment k, for example, matches a segment k of an address 3, the STA believes that the address segment matches the STA, and needs to receive a subsequent address segment. Correspondingly, when receiving the subsequent address segment, the STA only needs to compare the subsequent address segment with corresponding segments of the address 3, and does not need to compare the subsequent address segment with corresponding segments of another address. An address segment received by the STA in the wake-up window may match corresponding segments of a plurality of addresses in a storage table. For example, a value of an address segment that is received by the STA and whose index is 2 is 9EEF, and in this case, the value matches segments 2 of an address 2 and the address 3 in the foregoing table. In this case, the STA should maintain receive caches of both the address 2 and the address 3, and when receiving a subsequent address segment, should separately compare the subsequent address segment with corresponding segments of the address 2 and the address 3. For example, the STA subsequently receives a segment whose index is 3, a value of the segment is 48D2, and it is found through comparison that the value matches only a segment 3 of the address 3. In this case, the STA may discard the receive cache of the address 2, and maintains only the receive cache of the address 3.

When the STA receives, in the wake-up window, a short wake-up frame carrying an address segment that matches the STA, the STA should continue to receive a subsequent short wake-up frame. Specifically, when the STA receives, in the wake-up window, the short wake-up frame carrying the address segment that matches the STA, the STA may perform processing based on any one of the following methods:

(1) A SWR of the STA remains in an enabled state (in other words, no longer enters a dormant state), to receive the subsequent short wake-up frame.

(2) If the short wake-up frame includes a target sending time of a next short wake-up frame, the STA may still enter a dormant state, as long as the STA wakes up before the target sending time of the next short wake-up frame. This makes the STA save more power.

(3) Because the AP knows a length of the wake-up window of the STA, a regularity of sending short wake-up frames by the AP adapts to a length of a wake-up window of a target STA. For example, the length of the wake-up window of the STA is 2 ms, and in this case, a time interval between adjacent short wake-up frames does not exceed 2 ms but is not less than 1 ms. The STA assumes that the STA is a target device in a current wake-up process, and in this case, a next short wake-up frame arrives at least 1 ms later. Therefore, during that 1 ms, the STA may still enter a dormant state. In other words, the STA assumes that the STA is the target device in the current wake-up process, and in this case, the STA may determine a rough sending time of the next short wake-up frame, and before that time, the STA may enter the dormant state, to save more power.

From a moment at which the STA receives a first address segment that matches the STA, in any one of the following cases, the STA may abandon a current address segment collection process; and in other words, the STA determines that the STA is not a target wake-up device in a current wake-up process, and subsequently, the WUR may switch to a duty cycle mode.

(1) From a moment at which the STA receives, in the wake-up window of the STA, a first short wake-up frame carrying an address segment that matches the STA, within a predefined time (in other words, when the predefined time ends), if the STA does not collect N address segments whose indexes are different, the STA abandons the current address segment collection process.

(2) The STA collects, within a predefined time, N address segments whose indexes are different, and after restoring a complete address field based on these address segments, finds that the STA is not the target wake-up device, and skips continuing to collect a short wake-up frame.

(3) It is assumed that a short wake-up frame that is received by the STA and that carries an address segment matching the STA includes a first token value that identifies a wake-up process of a same STA. Within a predefined time, when receiving a short wake-up frame that carries a same first token value but carries an unmatched address segment, the STA immediately abandons the current address segment collection process. In this case, until a time when the current address segment collection process is abandoned, a quantity of address segments that are received by the STA, whose first token values are the same, and whose indexes are different is less than N. In other words, before collecting all N address segments whose indexes are different, the STA can determine that the STA is not a target wake-up frame in a current asynchronous wake-up process.

APs of different BSSs may need to simultaneously send cached data to STAs associated with the APs. In this case, if a STA is located at a location at which two BSSs overlap in coverage, the STA may receive short wake-up frames from two APs. If the STA determines, based on an address segment that is from an AP 1 and whose index is 1 and an address segment that is from an AP 2 and whose index is 2, whether the STA is a target wake-up device in a current wake-up process, an error occurs obviously. This problem may be resolved by using any one of the following methods:

(1) From a moment at which a first short wake-up frame with a matched address segment is received, within a time $T_0$, if the STA does not collect N address segments whose indexes are different and that match the STA, the STA discards all previously received segments, that is, abandons a current address segment collection process. $T_0$ should be greater than N times a length of a wake-up window. For example, $T_0=3N\times$Length of the wake-up window.

(2) Short wake-up frames sent by a same AP in one asynchronous wake-up process carry a same second token (Token2) value. For example, in the address segmentation method shown in FIG. 14, a TA field is a BSS color (a BSS color value, namely a short identifier of a BSS), and in this case, the BSS color is a second token that is used to differentiate short wake-up frames from different APs. It should be noted that a first token is different from the second token. The first token is used to differentiate different target wake-up devices in a same BSS, and is used in a scenario in which an AP wakes up a plurality of STAs at a time. The second token is used to differentiate short wake-up frames from different APs, and is used in a scenario in which adjacent BSSs need to simultaneously send short wake-up frames.

From a moment at which the STA receives a first address segment that matches the STA, when the STA receives, within a predefined time, N short wake-up frames carrying address segments whose indexes are different and that match corresponding address segments stored in the STA, the STA determines that the STA is a target wake-up device in a current wake-up process. Based on this, the STA wakes up a main communications interface of the STA, and sends a wake-up acknowledgement message to the AP by using the main communications interface. If the N short wake-up frames include first token values, the N first token values need to be the same; and if the N short wake-up frames include second token values, the N second token values also need to be the same.

In comparison with the prior art, in the embodiments provided in this application, the transmission time of the wake-up frame can be effectively reduced, so that the wake-up frame occupies less media in the asynchronous wake-up manner, and more resources are saved for data transmission, thereby improving media utilization.

Related parts of the method embodiments of the present invention may be mutually referenced. The devices provided in the device embodiments are configured to perform the methods provided in the corresponding method embodiments. Therefore, for understanding of the device embodiments, refer to related parts of related method embodiments.

The apparatus structural diagrams provided in the apparatus embodiments of the present invention show only simplified designs of corresponding apparatuses. In actual application, the apparatuses may include any quantity of transmitters, receivers, transceivers, processors, memories, and the like, to implement functions or operations performed by the apparatuses in the apparatus embodiments of the present invention, and all apparatuses that can implement this application fall within the protection scope of this application.

The names of the messages/frames, modules, or units provided in the embodiments of the present invention are only examples, and other names may be used provided that the functions of the messages/frames, modules, or units are the same.

A person of ordinary skill in the art should understand that all or some of the steps of the method embodiments may be implemented by a program instructing relevant hardware. The program may be stored in a readable storage medium of a device. When the program is executed, all or some of the steps are performed. The storage medium is, for example, any medium that can store program code, such as a USB flash drive, a removable hard disk, a read-only memory (Read-Only Memory, ROM), a random access memory (Random Access Memory, RAM), a magnetic disk, or an optical disc.

In the foregoing specific implementations, the objective, technical solutions, and benefits of the present invention are further described in detail. It should be understood that different embodiments can be combined. The foregoing descriptions are merely specific implementations of the present invention, but are not intended to limit the protection scope of the present invention. Any combination, modification, equivalent replacement, or improvement made without departing from the spirit and principle of the present invention should fall within the protection scope of the present invention.

The invention claimed is:

1. A method implemented by a sending device for sending a wake-up frame, wherein the method comprises:
    generating short wake-up frames, wherein each of the short wake-up frames comprises an index and an address segment that provides an incomplete transmitter address, an incomplete receiver address, or an incomplete base station subsystem (BSS) identifier, wherein, for each of the short wake-up frames, the index in the short wake-up frame indicates to what portion of an address corresponding to the address segment in the short wake-up frame the address segment in the short wake-up frame corresponds, wherein the short wake-up frames comprise N short wake-up frames whose N indexes are different than each other, and wherein N is a positive integer greater than two; and
    sending the short wake-up frames to a receiving device to cause the receiving device to determine, based on the N indexes corresponding to N address segments carried in the N short wake-up frames, whether the receiving device is a target wake-up device of the sending device.

2. The method of claim 1, wherein each of the short wake-up frames comprises a short frame indication that indicates that the short wake-up frame comprises the index or the address segment.

3. The method of claim 1, wherein before generating the short wake-up frames, the method further comprises:
    dividing an address field into N address segments, wherein the address field comprises at least one of a complete transmitter address, a complete receiver address, or a complete BSS identifier; and
    determining different indexes for the N address segments.

4. The method of claim 1, wherein each of the short wake-up frames comprises a time indication that indicates a target sending time of a next short wake-up frame.

5. The method of claim 1, wherein each of the short wake-up frames comprises a same first token value that identifies a current wake-up process.

6. The method of claim 1, wherein N is a predefined value, or wherein N is obtained through negotiation by the sending device and the target wake-up device.

7. A device for sending a wake-up frame, wherein the device comprises:
    a processor configured to generate short wake-up frames, wherein each of the short wake-up frames comprises an index and an address segment that provides an incomplete transmitter address, an incomplete receiver address, or an incomplete base station subsystem (BSS) identifier, wherein, for each of the short wake-up frames, the index in the short wake-up frame indicates to what portion of an address corresponding to the address segment in the short wake-up frame the address segment in the short wake-up frame corresponds, wherein the short wake-up frames comprise N short wake-up frames whose N indexes are different from each other, and wherein N is a positive integer greater than two; and
    a transceiver coupled to the processor and configured to send the short wake-up frames to cause a receiving device to determine, based on the N indexes corresponding to N address segments carried in the N short wake-up frames, whether the receiving device is a target wake-up device of the device.

8. The device of claim 7, wherein each of the short wake-up frames comprises a short frame indication that indicates that the short wake-up frame comprises the index or the address segment.

9. The device of claim 7, wherein before the processor generates the short wake-up frames, the processor is further configured to:
    divide an address field into the N address segments, wherein the address field comprises at least one of a complete transmitter address, a complete receiver address, or a complete BSS identifier; and
    determine different indexes for the N address segments.

10. The device of claim 7, wherein each of the short wake-up frames comprises a time indication that indicates a target sending time of a next short wake-up frame.

11. The device of claim 7, wherein each of the short wake-up frames comprises a same first token value that identifies a current wake-up process.

12. The device of claim 7, wherein N is a predefined value, or wherein N is obtained through negotiation between the device and the target wake-up device.

13. A device for receiving a wake-up frame, the device comprising:
    a memory;
    a receiver configured to receive a short wake-up frame in a wake-up window of the device, wherein the wake-up window is a time domain window in which the device is in an activated state; and
    a processor coupled to the memory and the receiver and configured to determine whether the short wake-up frame matches the device by being configured to determine that the short wake-up frame matches the device when a first address segment carried in the short wake-up frame is the same as a corresponding address segment of second address segments stored in the device, wherein each of the second address segments has a same index as an address segment to which the second address segment corresponds,
    wherein the receiver is further configured to receive V+1 short wake-up frames when the short wake-up frame matches the device, wherein $V \leq N-1$, wherein V and N are positive integers, wherein $N \geq 2$, wherein $V \geq 1$, wherein each of the V+1 short wake-up frames comprises a respective index of multiple indexes and a respective address segment of first address segment to which the respective index corresponds, wherein each respective index indicates a number of the respective address segments to which the respective index corresponds, wherein the multiple indexes in the V+1 short wake-up frames are different from each other, and wherein the receiver periodically works in the activated state and in a dormant state, and
    wherein the processor is further configured to generate N address segments and corresponding indexes based on an address field before the receiver receives the short wake-up frame in the wake-up window, and wherein the address field comprises at least one of a receiver address of the device, an address of another device that is associated with the device and that is capable of sending a short wake-up frame, or an identifier of a network to which the device belongs, wherein the memory is configured to store a mapping relationship between the address field, the N address segments, and the corresponding indexes, and wherein the processor is further configured to determine, based on the V+1 short wake-up frames, whether the device is a target wake-up device.

14. The device of claim 13, wherein each of the V+1 short wake-up frames comprises a short frame indication that indicates that the short wake-up frame comprises the respective index or the respective address segment.

15. The device of claim 13, wherein each of the V+1 short wake-up frames comprises a same first token value that identifies a current wake-up process.

16. The device of claim 13, wherein the processor is configured to determine that the device is the target wake-up device when the first address segments are the same as corresponding address segments stored in the device, wherein V=N−1, and wherein each of the corresponding address segments has a same index as a corresponding address segment of the first address segments.

17. The device of claim 13, wherein the processor is configured to determine that the device is not the target wake-up device when:

an address segment in any one of the V+1 short wake-up frames is different than a corresponding address segment stored in the device, or a predefined time ends when all address segments comprised in the V+1 short wake-up frames are the same as corresponding address segments stored in the device and V<N−1, wherein each of the corresponding address segments has a same index as a corresponding address segment of the first address segments.

18. The device of claim 13, wherein N is a predefined value, or wherein N is obtained through negotiation between the device and another device that is associated with the device and that is capable of sending a wake-up frame.

19. The device of claim 17, wherein the processor is further configured to determine that the device is not the target wake-up device when the address segment in any one of the V+1 short wake-up frames is different than the corresponding address segment stored in the device.

20. The device of claim 13, wherein N is obtained through negotiation between the device and another device.

* * * * *